(12) United States Patent
Kawaoka

(10) Patent No.: US 8,337,948 B2
(45) Date of Patent: Dec. 25, 2012

(54) METHOD FOR MANUFACTURING FILM-FORMED BODY

(75) Inventor: Hirokazu Kawaoka, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 74 days.

(21) Appl. No.: 12/955,995

(22) Filed: Nov. 30, 2010

(65) Prior Publication Data

US 2011/0070365 A1 Mar. 24, 2011

Related U.S. Application Data

(63) Continuation of application No. PCT/JP2009/060218, filed on Jun. 4, 2009.

(30) Foreign Application Priority Data

Jun. 9, 2008 (JP) .................................. 2008-150413

(51) Int. Cl.
B05D 1/12 (2006.01)
(52) U.S. Cl. ....................... 427/202; 427/189; 427/421.1
(58) Field of Classification Search .................. 427/189, 427/202, 421.1
See application file for complete search history.

(56) References Cited

U.S. PATENT DOCUMENTS

2005/0016839 A1* 1/2005 Horne et al. ................... 204/242
2006/0068084 A1* 3/2006 Shinozaki et al. .............. 427/64

FOREIGN PATENT DOCUMENTS

| JP | 2002-339058 | 11/2002 |
|----|-------------|---------|
| JP | 2004-300572 | 10/2004 |
| JP | 2006-83429  | 3/2006  |

OTHER PUBLICATIONS

International Search Report in International Application No. PCT/JP2009/060218; Mailing date: Aug. 4, 2009.

* cited by examiner

Primary Examiner — Frederick Parker
(74) Attorney, Agent, or Firm — Finnegan, Henderson, Farabow, Garrett & Dunner, LLP

(57) ABSTRACT

Provided is a method for manufacturing a film-formed body wherein a second film is formed by suppressing influence of existence/absence of a first film, at the time of forming the second film by making fine particles collide and deposited on a second film forming surface on a substrate whereupon the first film has been already formed. A film-formed body is provided with a foil-like substrate having a first film-forming surface and a second film-forming surface; a first film formed on a part of the first film-forming surface; and a second film formed at least on a part of the second film-forming surface. The first film includes an overlapping section which overlaps with the second film when viewed in the thickness direction of the substrate. A method for manufacturing such film-formed body is provided with a second film-forming step of forming the second film on the second film-forming surface whereupon the first film has been formed, by making the fine particles collide and deposited on the second film-forming surface, by using a supporting member having a supporting surface and a recessed section depressed from the supporting surface.

8 Claims, 17 Drawing Sheets

METHOD FOR MANUFACTURING FILM-FORMED BODY

CROSS-REFERENCE TO RELATED APPLICATIONS

This application is a continuation of International Patent Application No. PCT/JP2009/060218 filed on Jun. 4, 2009, which claims the priority of Japanese Application No. 2008-150413, filed Jun. 9, 2008, the entire contents of both of which are incorporated herein by reference.

TECHNICAL FIELD

The present invention relates to a method for manufacturing a film-formed body including a foil-like substrate (base body) and a film or layer formed on a film-forming surface thereof.

BACKGROUND ART

As a technique for forming a film or layer having a thickness less than about several hundreds μm on a substrate, an aerosol deposition method has been known. This aerosol deposition method is a technique for forming a film made of microparticles by stirring up raw microparticles in air by for example gas supply, vibration, ultrasonic vibration, etc., thereby dispersing (mixing) the microparticles in carrier gas for aerosolization, making this collide and deposited.

Patent Literature 1 discloses a technique for forming a composite structure (a film) simultaneously or sequentially on both surfaces of a film-like base material (substrate) by using the aerosol deposition method.

CITATION LIST

Patent Literature

Patent Literature 1: JP 2004-300572 A

SUMMARY OF INVENTION

Technical Problem

However, some consideration is given to the case in which a foil-like substrate having a first film-forming surface on which a first film has already been formed is to be formed with a second film on a second film-forming surface which is a back surface of the first film-forming surface of the substrate by the technique of Patent Literature 1. In this case, the second film-forming surface have a difference in ease of forming the second film between an overlapping portion which overlaps the first film through the substrate and other portions due to the influence of the thickness of the first film. This may cause such defects in the second film as non-uniform thickness and occurrence of a step or shoulder on or near a boundary area.

The present invention has been made in view of the circumstances to solve the above problems and has a purpose to provide a method for manufacturing a film-formed body in such a manner that a second film is formed on a second film-forming surface which is a back surface of a substrate whose first film-forming surface has already been formed with a first film, by making microparticles collide and be deposited on the second film-forming surface while suppressing the influence of existence/absence of the first film.

Solution to Problem

To achieve the above object, one aspect of the invention provides a method for manufacturing a film-formed body comprising: a foil-like substrate having a first film-forming surface and a second film-forming surface which is a back side of the first film-forming surface; a first film formed on a part of the first film-forming surface of the substrate; and a second film formed on at least part of the second film-forming surface of the substrate, the first film including an overlapping portion that overlaps with the second film when viewed in a thickness direction of the substrate, the method comprising: a second film-forming step of forming the second film by making microparticles collide with and be deposited on the second film-forming surface of the substrate on which the first film has been formed, wherein the second film-forming step including forming the second film by using a support member having a support surface and a recess depressed lower than the support surface, when a region of the second film-forming surface of the substrate, with which the microparticles are made to collide to form the second film, is referred to as a second film forming region, a film-forming overlap region of the overlapping portion of the first film, which overlaps with at least the second film forming region when viewed in the thickness direction of the substrate, is placed in the recess of the support member.

In the above film-formed body manufacturing method, in the second film-forming step of forming the second film on the second film-forming surface which is a back surface of the substrate on which the first film has already been formed, the film-forming overlap region of the overlapping portion of the first film is placed in the recess of the support member and the second film is formed.

Specifically, the second film is formed on the second film-forming surface while at least part of the first film in the thickness direction is placed in the recess depressed lower than the support surface. This makes it possible to reduce the influence of the thickness of the first film as compared with the case where the first film is not placed in the recess. Thus, the second film can be formed appropriately by preventing such defects that the thickness of the second film differs from portion to portion depending on the presence/absence of the first film on the surface and a step occurs.

The first film can be produced by any method not particularly limited. Accordingly, the same method as for the second film may be used but another method such as plating, coating, and sputtering may be used.

The method of forming the second film is a technique for forming the second film by making microparticles collide with and be deposited on the substrate. There are some examples such as an aerosol deposition method in which microparticles are raised or stirred up in gas such as air and blown against the substrate, causing the microparticles to collide and be deposited thereon, thereby forming the second film, a gas deposition method in which a raw material is evaporated and vaporized and then precipitated in the form of nanoparticles in gas phase, and the precipitated nanoparticles are dispersed in carrier gas and caused to collide with a substrate to form the second film. Furthermore, other alternatives may include thermal spraying, cold spraying, etc. In the case of a foil-like substrate, the aerosol deposition method and the gas deposition method are preferably adopted because aerosols or nanoparticles collide against the substrate at lower collision speeds than that in the thermal spraying and the cold spraying.

The foil-like substrate may have an appropriate shape such as a rectangular shape having a predetermined size and a long strip shape. Accordingly, as well as the case where the substrates each having a predetermined size are simultaneously subjected to the second film-forming step, a long substrate may be sequentially or continuously formed with second films from one end to the other end by movement in the longitudinal direction. In this case where a portion to be formed with the second film is moved for continuous formation, the second film forming region is also moved on the substrate with time.

The support member may be an integral member formed with a recess but may be constituted of a plurality of members. For example, it may be arranged that a member formed with a through hole in only a portion corresponding to the recess is placed on a base member to provide the support surface and the recess. The support surface is formed in the support member and defines a plane facing the substrate (or its first film-forming surface) (a substrate facing plane). This support surface may contact or may not contact with the substrate.

In the above film-formed body manufacturing method, preferably, the second film-forming step including placing a film-forming non-overlap region of a first exposed portion of the first film-forming surface on the support surface of the support member, the film-forming non-overlap region overlapping at least the second film forming region when viewed in the thickness direction of the substrate and the first exposed portion being exposed without being formed with the first film.

In the above film-formed body manufacturing method, in the second film-forming step of forming the second film on the second film-forming surface which is the back side of the substrate on which the first film has already been formed, the film-forming overlap region of the overlapping portion of the first film is placed in the recess of the support member, the film-forming non-overlap region of the first exposed portion of the first film-forming surface is placed on the support surface of the support member, and the second film is formed. This can reliably prevent such defects that the thickness of the second film differs from portion to portion and a step occurs.

In a method for manufacturing a film-formed body comprising: a foil-like substrate having a first film-forming surface and a second film-forming surface which is a back side of the first film-forming surface; a first film formed on a part of the first film-forming surface of the substrate; and a second film formed on at least part of the second film-forming surface of the substrate, the first film including an overlapping portion that overlaps with the second film when viewed in a thickness direction of the substrate, preferably, the method comprises: a second film-forming step of forming the second film by making microparticles collide with and be deposited on the second film-forming surface of the substrate on which the first film has been formed, wherein the second film-forming step including forming the second film by using a support member having a support surface and a recess depressed lower than the support surface, and the second film-forming step including forming the second film while holding the overlapping portion of the first film in the recess of the support member and holding a first exposed portion of the first film-forming surface, the first exposed portion being not formed with the first film, on the support surface of the support member.

In this film-formed body manufacturing method, in the second film-forming step of forming the second film on the second film-forming surface of the substrate in which the first film has already been formed on the first film-forming surface, the second film is formed while the overlapping portion of the first film is placed in the recess of the support member and also the first exposed portion of the first film-forming surface is placed on the support surface of the support member.

This can reduce the influence of presence/absence of the first film as compared with the case where the overlapping portion of the first film is not placed in the recess.

The substrate may include for example a configuration that enables simultaneous formation of second films on a substrate held at rest with respect to the substrate.

In the above film-formed body manufacturing method, preferably, the recess of the support member has a depth larger than thickness of the first film, the second film-forming step includes forming the second film while holding the film-forming non-overlap region on the support surface of the support member.

If the depth of the recess of the support member is smaller than the thickness of the first film, a part of the first film in the thickness direction protrudes from the recess. Accordingly, the substrate (the first film-forming surface) is liable to separate from and come out of contact with the support surface around the first film.

In this case, the second film-forming surface includes a portion whose back side (the first film-forming surface side) contacts with the support surface and a portion whose back side does not contact with the support surface. Thus, the ease of forming the second film, the thickness, and the property of the second film may differ according to the portions.

According to the aforementioned film-formed body manufacturing method, on the other hand, the depth of the recess is larger than the thickness of the first film, so that the whole first film in the thickness direction can be received (placed) in the recess. Also, the film-forming non-overlap region is supported by the support surface of the support member. This can prevent the substrate from separating from the support surface around the first film and also avoid a difference in the ease of forming the second film due to the separation.

Alternatively, in the above film-formed body manufacturing method, preferably, the recess of the support member has a depth less than or equal to the thickness of the first film, the support surface of the support member and a bottom surface of the recess have different hardnesses, the hardnesses are determined such that a difference in thickness between a portion of the second film overlapping with the film-forming overlap region and a portion of the second film overlapping with the film-forming non-overlap region when viewed in the thickness direction of the substrate is smaller than that when the second film is formed in the second film-forming step in the case where the support surface and the bottom surface of the recess have the same hardness.

In the portion overlapping with the film-forming overlap region in the second film-forming surface, the first film and the substrate are present between the second film and the bottom surface of the recess of the support member. On the other hand, in the portion overlapping with the film-forming non-overlap region in the second film-forming surface, only the substrate is present between the second film and the support surface of the support member, that is, it is different in the presence/absence of the first film. For instance, therefore, the influence of impact on the microparticles is different between a case where the support surface and the bottom surface of the recess of the support member are made of the same material (e.g., the same metal material) and with the same hardness and the microparticles are made to collide and be deposited on the film-forming overlap region and a case where microparticles are made to collide and be deposited on the film-forming non-overlap region. This may result in the second films formed with different thickness.

In the aforementioned film-formed body manufacturing method, on the other hand, the support surface and the bottom surface of the recess of the support member are designed to be different in hardness. This can prevent such defects that the thickness of the second film differs between the film-forming overlap region and the film-forming non-overlap region due to the influence of hardness of both surfaces.

A method for providing different hardness between the support surface and the bottom surface of the recess may be achieved by for example forming a film identical to the first film or a film made of a different material from the first film but with the same hardness on the support surface, thereby providing different hardness between the support surface and the bottom surface of the recess.

In the above film-formed body manufacturing method, preferably, the support surface is formed of a film made of the same material and with the same thickness as the first film.

In the aforementioned film-formed body manufacturing method, the support surface of the support member is made of the same material and further with the same thickness as the first film. Accordingly, when the substrate on which the first film has been formed is to be supported by the support member, the first film contacting with the substrate in the film-forming overlap region can be the same in material and thickness as the film of the support surface with which the substrate in the film-forming non-overlap region contacts. In other words, the ease of forming the second film can be uniform between a portion overlapping with the film-forming overlap region and a portion overlapping with the film-forming non-overlap region in the second film-forming surface. Thus, the second film can be formed with uniform thickness and quality over the second film-forming surface of the substrate.

In one of the above film-formed body manufacturing methods, preferably, the second film-forming step adopts an aerosol deposition method or a gas deposition method.

In the aforementioned film-formed body manufacturing method, the second film-forming step adopts the aerosol deposition method or the gas deposition method. For example, the collision speed of aerosols or nanoparticles can be made lower than that in the case of using thermal spraying or cold spraying, so that film formation can be achieved without deforming the foil-like substrate.

REFERENCE SIGNS LIST 1, 101 Film-formed body
11, 111 First film
12, 112 Second film
20, 120 Metal foil (Substrate)
21, 121 First metal principal surface (First film-forming surface)
21F, 121F First exposed portion (First exposed portion)
22, 122 Second metal principal surface (Second film-forming surface)
53, 153 Metal foil support member (Support member)
55, 155, 255 Support surface
56, 156, 256 Recess
56D, 156D, 256D Bottom surface (of Recess)
253 Second backup roll member (Support member)
D2 Second mixed microparticles (Microparticles)
D3 Third microparticles (Microparticles)
DT Thickness direction (of metal foil)
F1, F2, F3 Depth (of Recess)
LW Overlapping portion (of first film)
R Second-film forming region
RW Film-forming overlap region
RX Film-forming non-overlap region
SF1, SF2 Film
TS Film thickness (Thickness) (of film SF)

DESCRIPTION OF EMBODIMENTS

First Embodiment

A detailed description of a first preferred embodiment of the present invention will now be given referring to the accompanying drawings.

Figure 1:
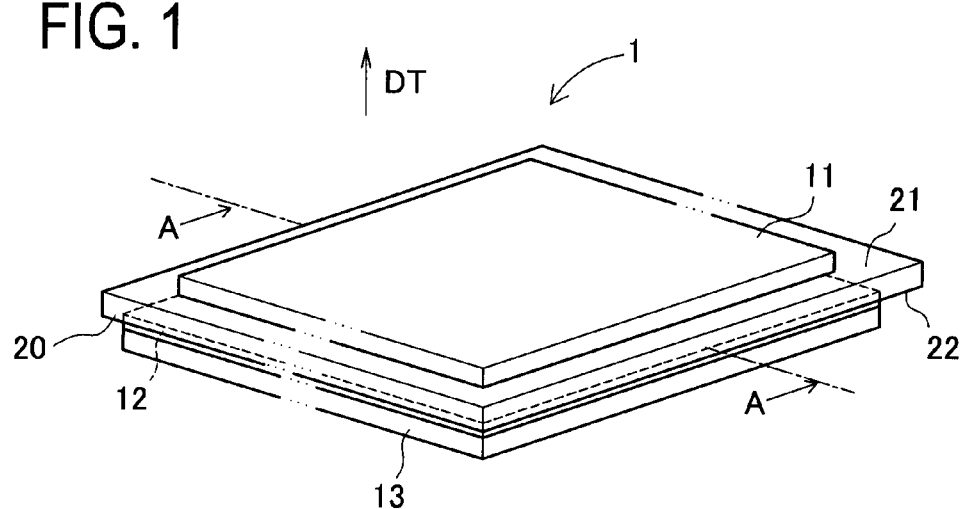
FIG. 1 is a perspective view of a film-formed body in a first embodiment and a first modified example.

A film-formed body 1 of the first embodiment will be first explained. FIG. 1 is a perspective view of the film-formed body 1 and FIG. 2 is a sectional view (section A-A in FIG. 1) of the film-formed body 1.

The film-formed body 1 of the first embodiment includes a rectangular metal foil 20 made of stainless steel, a first film (layer) 11 containing a mixture of lithium titanium oxide ($Li_4Ti_5O_{12}$) and phosphate solid electrolyte ($Li_{1.3}Al_{0.3}Ti_{1.7}(PO_4)_3$), and a second film (layer) 12 containing a mixture of lithium cobalt oxide ($LiCoO_2$) and phosphate solid electrolyte ($Li_{1.3}Al_{0.3}Ti_{1.7}(PO_4)_3$), and besides, a third film 13 containing phosphate solid electrolyte ($Li_{1.3}Al_{0.3}Ti_{1.7}(PO_4)_3$). In this film-formed body 1, the first film 11 is formed on a first metal principal surface 21 facing upward in FIGS. 1 and 2, of the metal foil 20, and the second film 12 is formed on a second metal principal surface 22 facing downward in FIGS. 1 and 2, which is an opposite side to the first metal principal surface 21, and further the third film 13 is formed on the second film 12.

Figure 2:
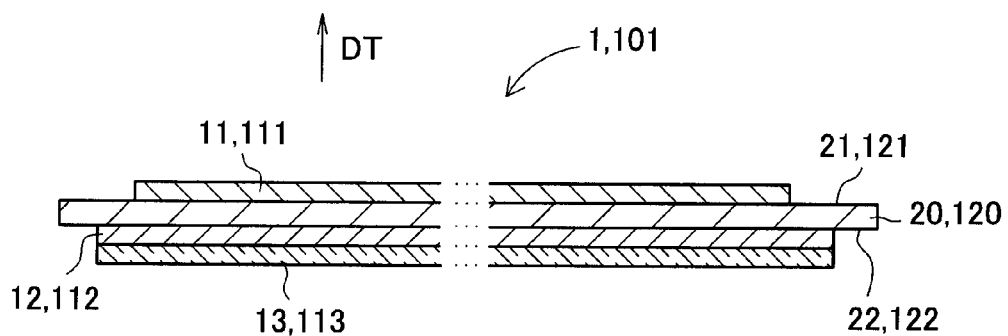
FIG. 2 is a sectional view (section A-A in FIG. 1 and section C-C in FIG. 12) of the film-formed body in the first embodiment, a second embodiment, and the first modified example.
Figure 3:
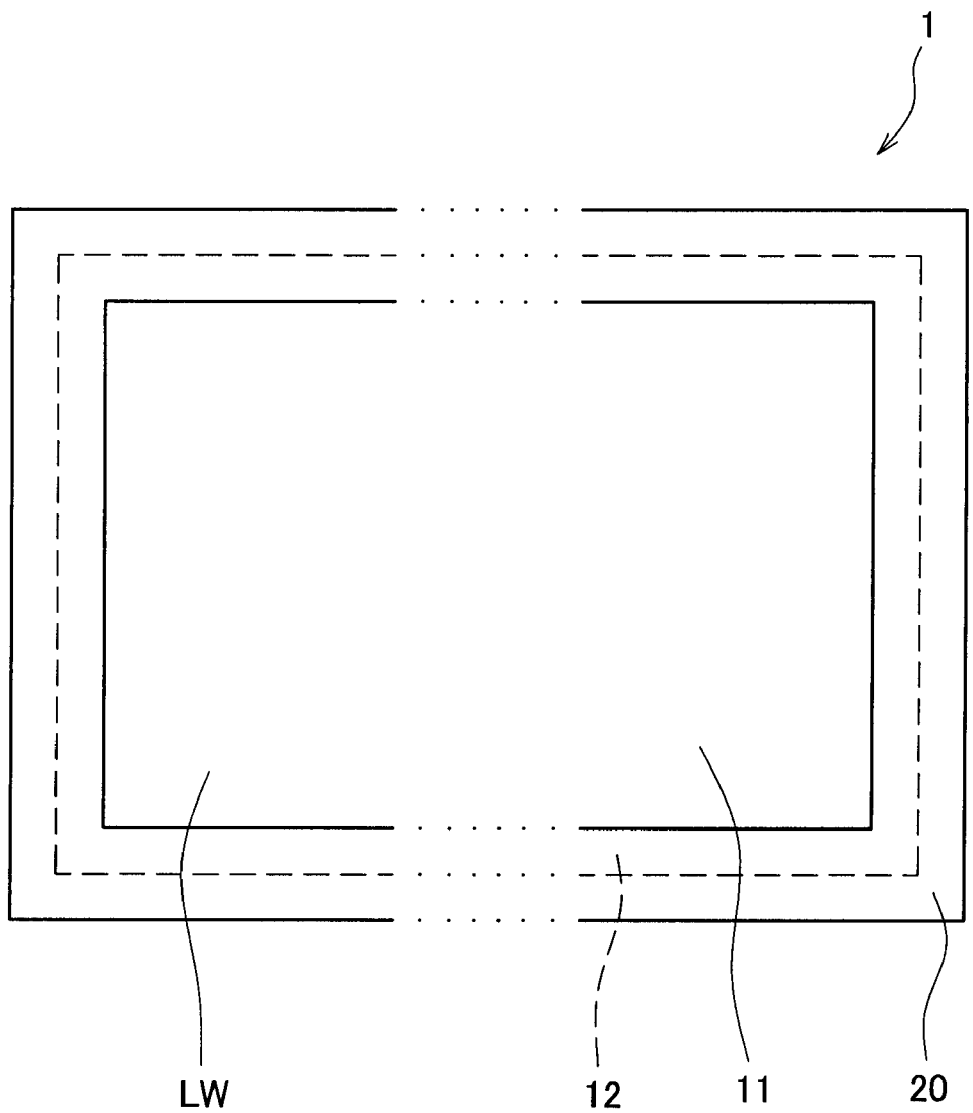
FIG. 3 is a top view of the film-formed body in the first embodiment and the first modified example.

As shown in the sectional view of the film-formed body 1 in FIG. 2, the size of the second film 12 in a lateral direction in FIG. 2 is larger than the size of the first film 11. When the film-formed body 1 is viewed in a thickness direction DT of the metal foil 20 (see FIG. 3), the first film 11 is positioned on a frontmost side in FIG. 3, the metal foil 20 is located behind the first film 11, and further the second film 12 is positioned further behind this metal foil 20 in FIG. 3. When the film 11 is entirely viewed in the thickness direction DT of the metal foil 20, the first film 11 is also an overlapping portion LW that overlaps with the second film 12.

In the film-formed body 1, the lithium titanium oxide ($Li_4Ti_5O_{12}$) of the first film 11 can be used as a negative active material of a lithium ion secondary battery. The lithium cobalt oxide of the second film 12 can be used as a positive active material of the lithium ion secondary battery. Furthermore, the phosphate solid electrolyte ($Li_{1.3}Al_{0.3}Ti_{1.7}(PO_4)_3$) of the first film 11, the second film 12, and the third film 13 can be used as an electrolyte of the lithium ion secondary battery.

Figure 4:
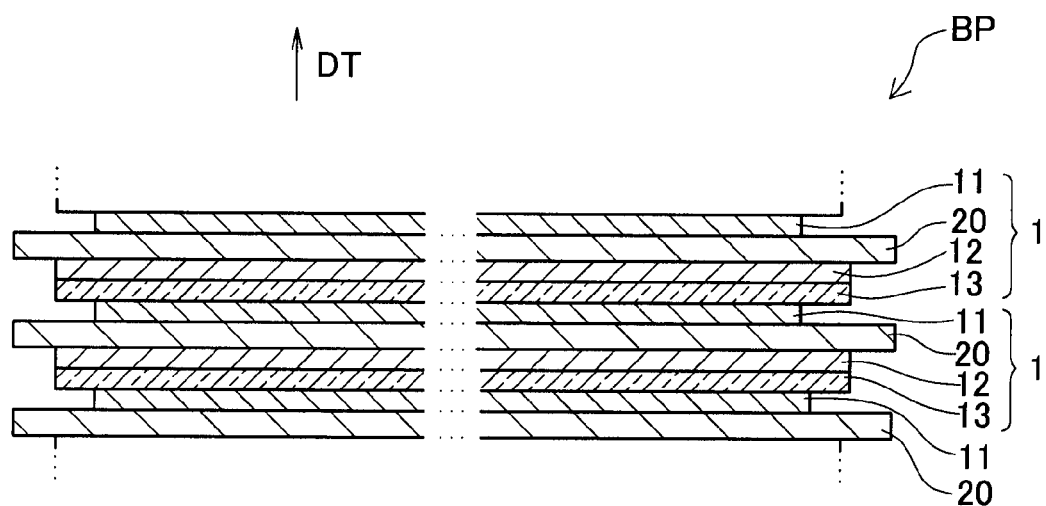
FIG. 4 is an explanatory view of a power generating element of a bipolar secondary battery.

Specifically, when a plurality of the above film-formed bodies 1 is laminated in the thickness direction DT, for example, a power generating element BP of a bipolar secondary battery is made up as shown in FIG. 4. The bipolar secondary battery refers to a battery provided with a positive electrode and a negative electrode on a single electrode plate (an electrode foil).

The first film 11 of the film-formed body 1 is formed by the aerosol deposition method using a first film-forming device 40 mentioned later and the second film 12 and the third film 13 are formed by the aerosol deposition method using a second film-forming device 50 mentioned later.

A manufacturing method of the film-formed body 1 in the first embodiment will be explained below with reference to the drawings.

Figure 5:
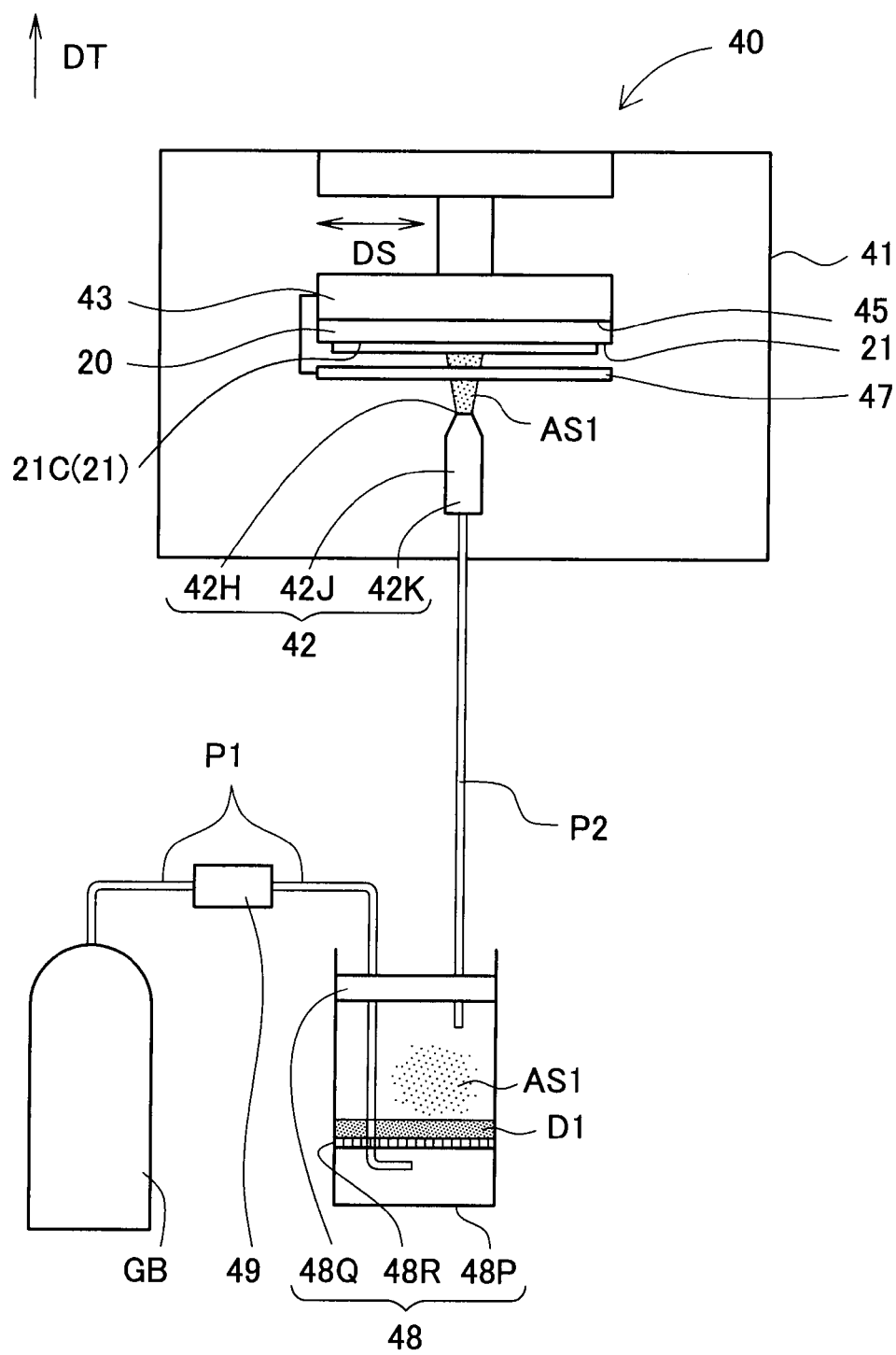
FIG. 5 is an explanatory view of a first film-forming step for the film-formed body in the first embodiment.

FIG. 5 is a schematic view of the first film-forming device 40 for forming the first film 11 on the metal foil 20 by the aerosol deposition method. This first film-forming device 40 includes a film forming chamber 41, an aerosol generator 48, a regulator 49, a gas bomb GB, a gas pipe P1, and an aerosol pipe P2.

The gas bomb GB of the first film-forming device 40 is internally filled with high-pressure argon gas used as carrier gas (not shown). This gas bomb GB feeds the carrier gas toward the aerosol generator 48 through the metal gas pipe P1 connected to the gas bomb GB. At some point in the gas pipe P1, the regulator 49 is placed to regulate a flow rate of the carrier gas to be fed from the gas bomb GB.

The aerosol generator 48 includes a container 48P having a bottom-closed cylindrical shape, a closing stopper 48Q that closes an opening this container 48P, and an inside bottom plate 48R having a meshed plate surface placed, like a raised bottom, at a predetermined distance from the bottom (a lower position in FIG. 5) of the container 48P.

The above gas pipe P1 and the aerosol pipe P2 each extend passing through the closing stopper 48Q. The gas pipe P1 extends passing through the inside bottom plate 48R as shown in FIG. 5. On the inside bottom plate 48R facing to the stopper 48Q, first mixed microparticles (fine particles) D1 containing a mixture of both lithium titanium oxide ($Li_4Ti_5O_{12}$) powder and phosphate solid electrolyte ($Li_{1.3}Al_{0.3}Ti_{1.7}(PO_4)_3$) powder are stored. A mesh hole diameter of the plate surface of the inside bottom plate 48R is smaller than a particle diameter of the first mixed microparticles D1. Accordingly, this inside bottom plate 48R does not allow the first microparticles D1 to pass therethrough but does allow gas, i.e., the carrier gas (not shown) to pass therethrough. The aerosol generator 48 can generate first aerosol AS1 made of the first microparticles D1 dispersed in the carrier gas.

The film forming chamber 41 includes a metal foil support member 43 for holding the metal foil 20 while exposing the first metal principal surface 21 and a single-port injection nozzle 42 for injecting the microparticles toward the exposed first metal principal surface 21 of the metal foil 20. In this film forming chamber 41, the metal foil support member 43 and the injection nozzle 42 are placed. By use of a vacuum pump not shown, the pressure in the chamber can be reduced to $10^{-1}$ Pa.

The metal foil support member 43 holds the metal foil 20 on a flat support surface 45 and moves in a plane direction of the metal foil 20 in FIG. 5 to adjust the thickness of a film to be formed on the metal foil 20. This metal foil support member 43 is arranged to place a mask 47 of a rectangular frame shape between the injection nozzle 42 and the metal foil 20 to form the first film 11 in a predetermined position on the first metal principal surface 21.

The injection nozzle 42 includes a cylindrical main part 42J and an injection part 42H located on a nearer side to the metal foil 20 than the main part 42J. The injection part 42H has a tapered shape whose diameter is smaller as closer to the metal foil 20 side and is arranged to inject aerosol through its orifice. On an opposite side from the injection part 42H with respect to the main part 42J, the injection nozzle 42 further includes a connection part 42K connected to the above aerosol pipe P2. This injection nozzle 42 is configured to inject the first aerosol AS1 toward the metal foil 20 by further accelerating the aerosol AS1 through the tapered injection part 42H (see FIG. 5).

Figure 6:
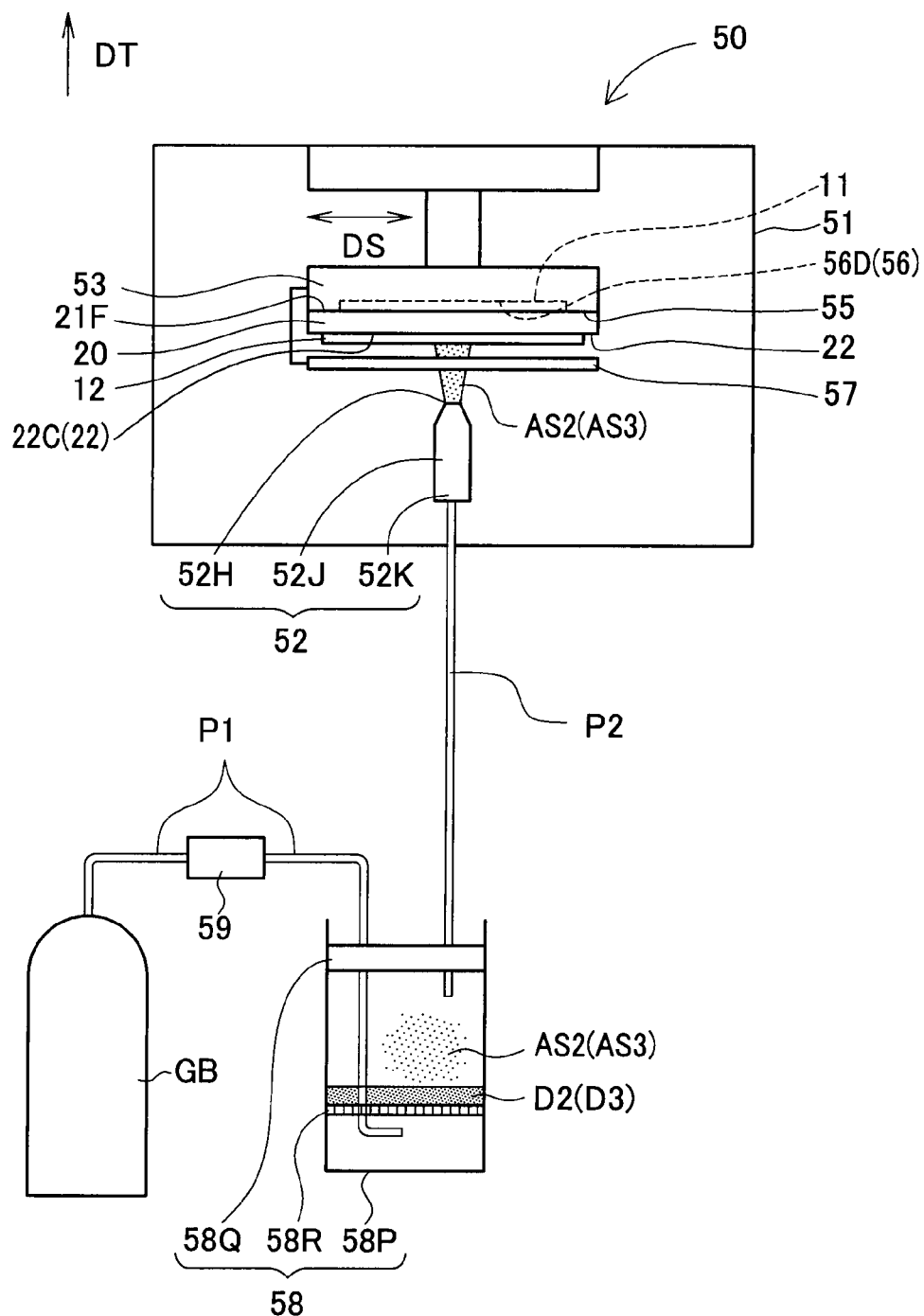
FIG. 6 is an explanatory view of a second film-forming step for the film-formed body in the first embodiment.

FIG. 6 is a schematic view of a second film-forming device 50 for forming the second film 12, by the aerosol deposition method, on the second metal principal surface 22 of the metal foil 20 on which the first film 11 has been formed. This second film-forming device 50 includes a film forming chamber 51, an aerosol generator 58, a regulator 59, a gas bomb GB, a gas pipe P1, and an aerosol pipe P2.

The gas bomb GB, the gas pipe P1, and the aerosol pipe P2 in the second film-forming device 50 are identical to those in the above first film-forming device 40. The aerosol generator 58 is also identical to the aerosol generator 48 excepting that second mixed microparticles D2 containing a mixture of both lithium cobalt oxide powder and phosphate solid electrolyte ($Li_{1.3}Al_{0.3}Ti_{1.7}(PO_4)_3$) powder are stored on an inside bottom plate 58R of the aerosol generator 58.

The film forming chamber 51 includes a metal foil support member 53 for holding the metal foil 20 while exposing the second metal principal surface 22 and a single-port injection nozzle 52 for injecting the microparticles toward the exposed second metal principal surface 22 of the metal foil 20. In this film forming chamber 51, the metal foil support member 53 and the injection nozzle 52 are placed. By use of a vacuum pump not shown, as with the first film-forming device 40, the pressure in the chamber can be reduced to $10^{-1}$ Pa.

The injection nozzle 52 is configured, as in the first film-forming device 40, to inject second aerosol AS2 fed from the above aerosol generator 58 toward the metal foil 20 by further accelerating the aerosol AS2 through the tapered injection part 52H (see FIG. 6).

Figure 7:
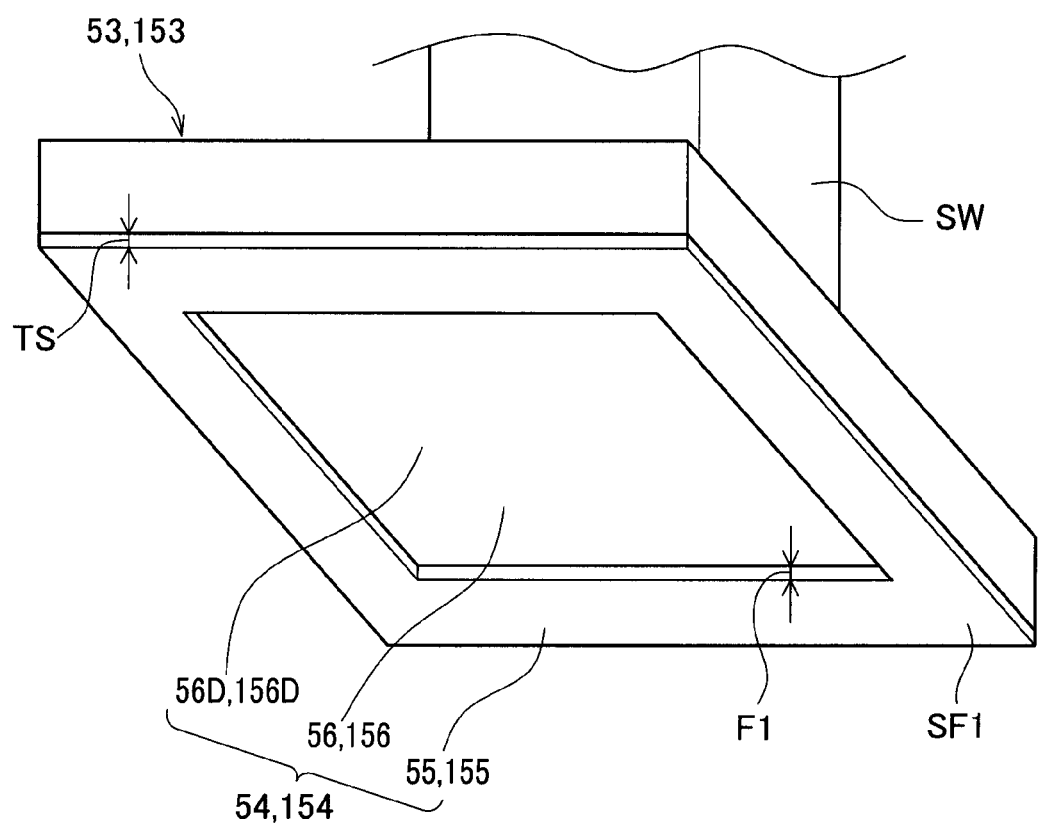
FIG. 7 is an explanatory view of a second film-forming step for the film-formed body in the first embodiment and the first modified example.

The metal foil support member 53 includes, as shown in FIG. 7, a holding part 54 for holding the metal foil 20 and a slide part SW for moving the metal foil 20 held in the holding part 54 in its plane direction. This metal foil support member 53 is further arranged to place a mask 57 between the injection nozzle 52 and the metal foil 20. The mask 57 is formed with a through hole for forming the second film 12 in a predetermined position on the second metal principal surface 22.

The holding part 54 made of metal includes a recess 56 centrally located and configured to be slightly larger than the plane shape (a rectangular shape in this embodiment) of the first film 11 to receive the first film 11 and a support surface 55 located along the circumference of the recess 56 and raised by a step from the recess 56. A bottom surface 56D of the recess 56 is defined by an exposed part of the metal forming the holding part 54. The depth F 1 of the recess 56 is equal to the thickness T1 of the first film 11 formed on the metal foil 20. Accordingly, when the metal foil 20 formed with the first film 11 is to be held by the metal foil support member 53, the first film 11 can be received in the recess 56 so as to contact with the bottom surface 56D.

The support surface 55 of the holding part 54 is coated with a film SF1 made of lithium titanium oxide ($Li_4Ti_5O_{12}$) and phosphate solid electrolyte ($Li_{1.3}Al_{0.3}Ti_{1.7}(PO_4)_3$), as with the first film 11. Thus, the support surface 55 has a first hardness. On the other hand, the bottom surface 56D of the recess 56 is made of the metal forming the holding part 54 and hence has a second hardness different from the first hardness. Those first and second hardnesses are determined to prevent a difference in the ease of forming the second film 12 on the second forming surface 22C of the second metal principal surface 22 (e.g., the reactive force the second aerosol AS2 (the second mixed microparticles D2) receives from the metal foil 20 when collides therewith) and make the ease of film-forming uniform in the plane direction.

Specifically, in a portion overlapping with a film-forming overlap region RW mentioned later of the metal foil 20 formed with the first film 11, the first film 11 and the metal foil 20 are located between the second metal principal surface 22 and the bottom surface 56D of the recess 56. In a portion overlapping with a film-forming non-overlap region RX mentioned later in the second metal principal surface 22, the metal foil 20 is located between the second metal principal surface 22 and the support surface 55. The ease of forming the second film 12 in the portion overlapping with the film-forming overlap region RW is influenced by the hardness of the first film 11, the hardness of the metal foil 20 itself, and the second hardness of the bottom surface 56D of the recess 56. On the other hand, the ease of forming the second film 12 in the portion overlapping with the film-forming non-overlap region RX is influenced by the hardness of the metal foil 20 itself and the first hardness of the support surface 55. Accordingly, the first hardness and the second hardness are determined to provide the same ease of forming the second film 12 in the portion overlapping with the film-forming overlap region RW and the portion overlapping with the film-forming non-overlap region RX in the second metal principal surface 22.

Furthermore, the support surface 55 of the metal foil support member 53 is coated with the film SF1 made of the same material as that for the first film 11. In addition, the thickness TS of this film SF1 is set to be equal (TS=T1) to the thickness T1 of the first film 11. Thus, when the metal foil support member 53 supports the metal foil 20 formed with the first film 11, the first film 11 with which the metal foil 20 contacts in the film-forming overlap region RW and the film SF1 with which the metal foil 20 contacts in the film-forming non-overlap region RX are made of the same material and with the same film thickness. In the first embodiment, specifically, the ease of forming the second film 12 is made uniform between the portion overlapping with the film-forming overlap region RW and the portion overlapping with the film-forming non-overlap region RX.

In a second film-forming step mentioned later, consequently, the second film 12 can be formed with uniform thickness and quality over the second film-forming surface 22C of the second metal principal surface 22.

A first film-forming step of forming the first film 11 on the metal foil 20 by using the aforementioned first film-forming device 40 will be explained referring to FIG. 5.

To be concrete, firstly, the metal foil 20 is set on the metal foil support member 43 in the film forming chamber 41 so that the first metal principal surface 21 of the metal foil 20 faces the injection nozzle 42. Subsequently, the mask 47 is disposed between the metal foil 20 (the first metal principal surface 21) and the injection nozzle 42 to allow the first aerosol AS1 to be injected onto the first film-forming surface 21C of the first metal principal surface 21 to form the first film 11. Then, the film forming chamber 41 is sealingly closed and depressurized by a vacuum pump not shown to $10^2$ Pa.

The first microparticles D1 are supplied on the inside bottom plate 48R of the aerosol generator 48 and then the opening of the container 48P is closed with the stopper 48Q.

Then, the regulator 49 placed at some point in the gas pipe P1 is controlled to flow a predetermined flow rate of carrier gas (not shown) from the gas bomb GB. This carrier gas will flow in the aerosol generator 48 through the gas pipe P1. In the aerosol generator 48, as shown in FIG. 5, an end port of the gas pipe P1 is located between the inside bottom plate 48R and the bottom of the container 48P. Accordingly, the carrier gas flowing in through the end port of this gas pipe P1 passes through the inside bottom plate 48R to move to an exit, i.e., the aerosol pipe P2 passing through the stopper 48Q. Passage of this carrier gas causes the first microparticles D1 to be raised or stirred up in a space between the inside bottom plate 48R and the stopper 48Q, thereby producing the first aerosol AS1. Thus, the carrier gas carries the first microparticles D1 of a predetermined carrying quantity per unit time, which is determined by the flow rate of carrier gas.

The thus produced first aerosol AS1 is delivered to the injection nozzle 42 of the film forming chamber 41 through the aerosol pipe P2.

The first aerosol AS1 delivered to the injection nozzle 42 is further accelerated through the tapered injection part 42H and injected toward the first film-forming surface 21C of the first metal principal surface 21 of the metal foil 20, on which the first film 11 is to be formed. Simultaneously, the metal foil support member 43 holding the metal foil 20 is moved in the plane direction DS to form the first film 11 over the entire first film-forming surface 21C of the first metal principal surface 21.

On the first film-forming surface 21C of the first metal principal surface 21, consequently, the first film 11 made of the material (lithium titanium oxide ($Li_4Ti_5O_{12}$) and phosphate solid electrolyte ($Li_{1.3}Al_{0.3}Ti_{1.7}(PO_4)_3$) originating from the first microparticles D1 is formed with the thickness T1.

Figure 8:
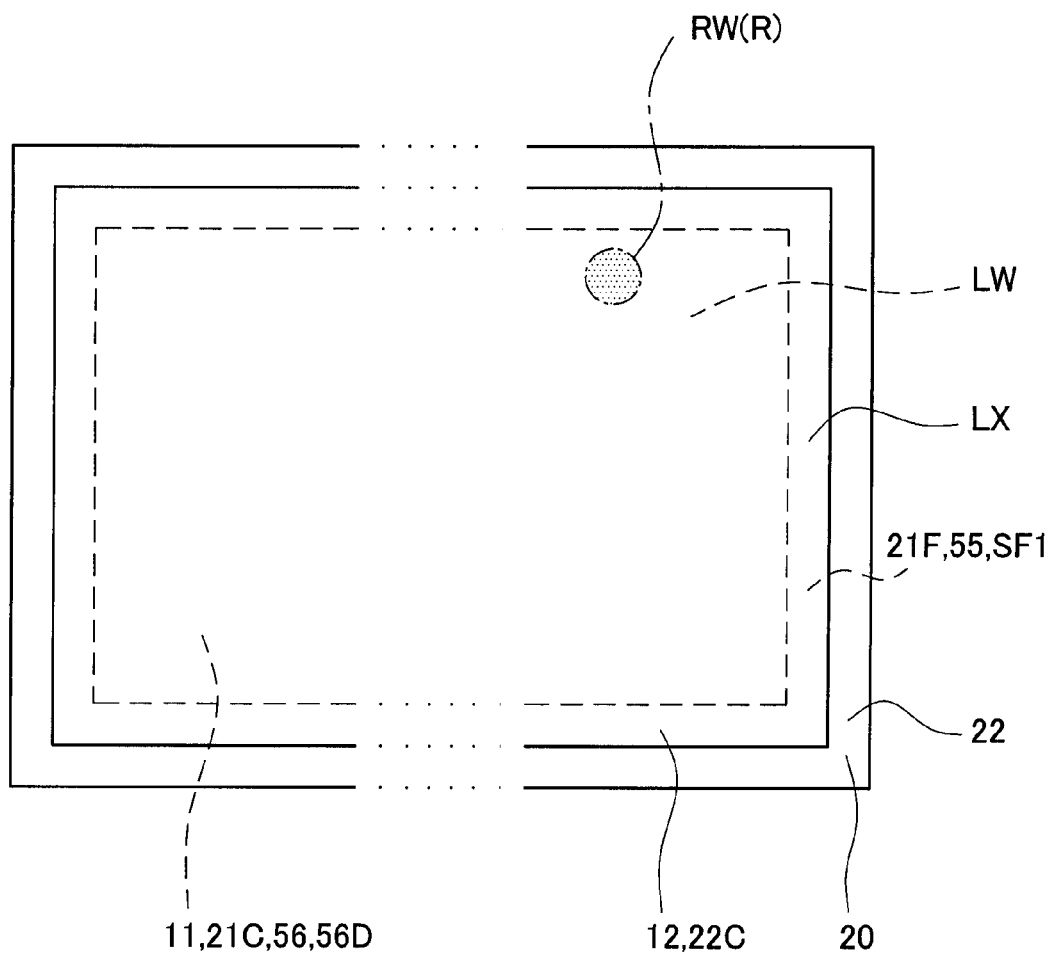
FIG. 8 is an explanatory view of the second film-forming step for the film-formed body in the first embodiment.
Figure 9:
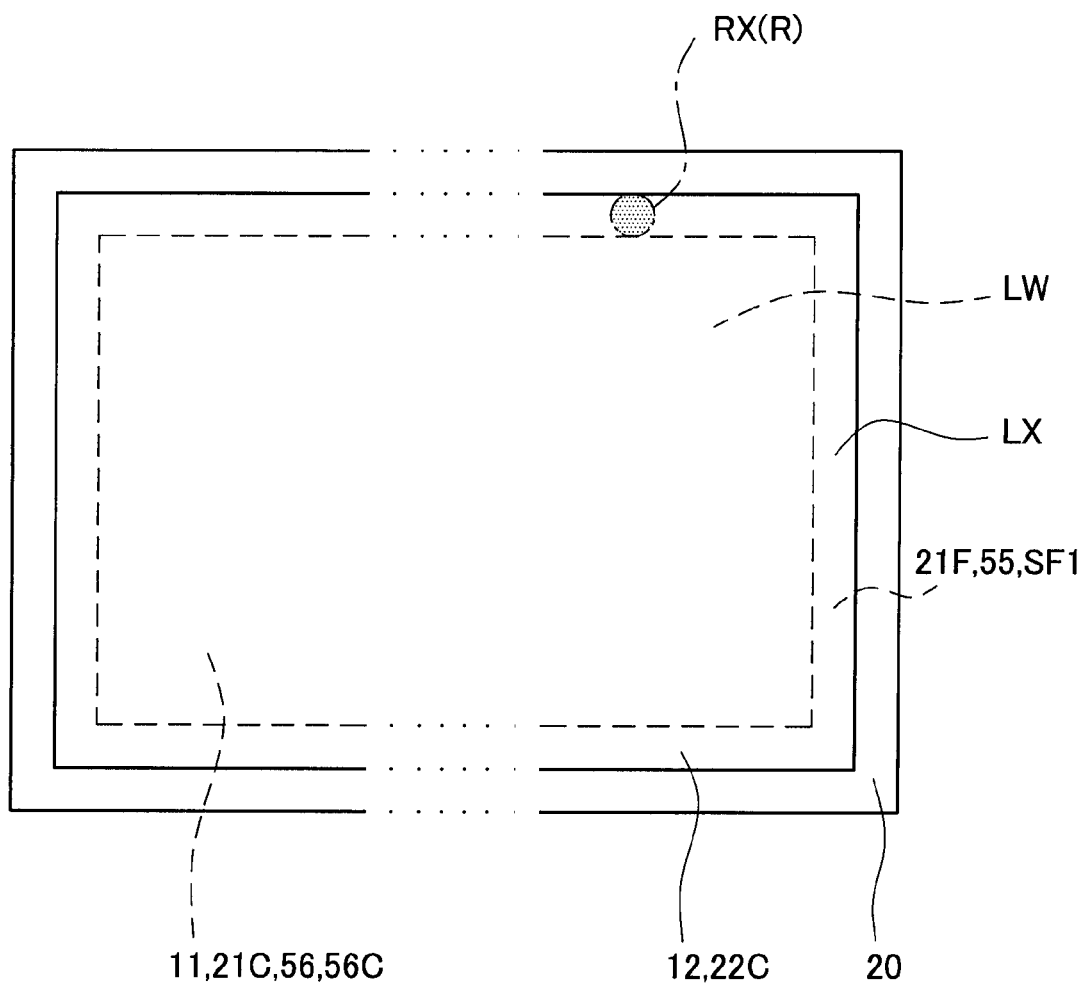
FIG. 9 is an explanatory view of the second film-forming step for the film-formed body in the first embodiment.

The following explanation is given to the second film-forming step of forming the second film 12, by use of the aforementioned second film-forming device 50, on the metal foil 20 formed with the first film 11, referring to FIGS. 6, 8, and 9.

Firstly, the metal foil 20 formed with the first film 11 is set on the metal foil support member 53 of the film forming chamber 51. Specifically, the entire first film 11 is received in the recess 56 of the holding part 54 of the metal foil support member 53 so that the first exposed portion 21F uncoated with the first film 11, of the first metal principal surface 21 of the metal foil 20, contacts with the support surface 55 (see FIG. 6). In this way, the second metal principal surface 22 of the metal foil 20 is placed to face the injection nozzle 52 (see FIG. 6). At that time, the second metal principal surface 22 is a flat surface having no steps or the like.

The mask 57 is disposed between the metal foil 20 (the first metal principal surface 21) and the injection nozzle 52 to allow the second aerosol AS2 to be injected to the second film-forming surface 22C of the second metal principal surface 22. Then, as with the first film-forming step mentioned above, the film forming chamber 51 is sealingly closed and depressurized by a vacuum pump not shown to $10^2$ Pa.

Furthermore, the second mixed microparticles D2 are supplied on the inside bottom plate 58R of the aerosol generator 58 and then the opening of the container 58P is closed with the stopper 58Q.

As with the first film-forming step, subsequently, the regulator 59 placed at some point in the gas pipe P1 is controlled to flow a predetermined flow rate of carrier gas (not shown) from the gas bomb GB. This carrier gas will flow in the aerosol generator 58 through the gas pipe P1. Accordingly, this carrier gas causes the second mixed microparticles D2 to be raised or stirred up in a space between the inside bottom plate 58R and the stopper 58Q, thereby producing the second aerosol AS2. Thus, the second mixed microparticles D2 of a predetermined carrying quantity per unit time, which is determined by the flow rate of carrier gas, are carried by the carrier gas.

The thus produced second aerosol AS2 is delivered to the injection nozzle 52 of the film forming chamber 51 through the aerosol pipe P2 as with the first film-forming step.

The second aerosol AS2 delivered to the injection nozzle 52 is further accelerated through the tapered injection part 52H and injected to the second film-forming surface 22C of the second metal principal surface 22 of the metal foil 20. Thus, the second mixed microparticles D2 collide with and are deposited on the second metal principal surface 22.

The slide part SW of the metal foil support member 53 holding the metal foil 20 is moved in the plane direction DS to form the second film 12 over the entire second film-forming surface 22C of the second metal principal surface 22 of the metal foil 20.

The metal foil 20 held in the metal foil support member 53 and subjected to injection of the second aerosol AS2 is shown in FIGS. 8 and 9 when viewed from the thickness direction DT of the metal foil 20. The details are further explained referring to the drawings.

A region of the second metal principal surface 22 with which the second mixed microparticles D2 is colliding to form the second film 12 is referred to as a second film forming region R. A region of the overlapping portion LW (the first film 11) that overlaps the second film-forming region R when viewed in the thickness direction DT of the metal foil 20 is referred to as a film-forming overlap region RW. In the manufacturing method of the film-formed body 1 in the first embodiment, accordingly, this film-forming overlap region RW is placed in the recess 56 of the metal foil support member 53 (see FIG. 8). On the other hand, a region of the first exposed portion 21F of the first metal principal surface 21 of the metal foil 20, the region overlapping with the second film-forming region R, is referred to as a film-forming non-overlap region RX. In the first embodiment, this film-forming non-overlap region RX is placed on the support surface 55 of the metal foil support member 53 (see FIG. 9).

As above, while the film-forming overlap region RW is received in the recess 56, the film-forming non-overlap region RX is placed on the support surface 55. The film-forming ease is made uniform between a portion overlapping with the film-forming overlap region RW and a portion overlapping with the film-forming non-overlap region RX in the second film-forming surface 22C, so that the second mixed microparticles D2 uniformly collide with and are deposited on the second film-forming surface 22C of the second metal principal surface 22.

On the second film-forming surface 22C of the second metal principal surface 22, the second film 12 made of the material (lithium titanium oxide ($Li_4Ti_5O_{12}$) and phosphate solid electrolyte ($Li_{1.3}Al_{0.3}Ti_{1.7}(PO_4)_3$)) originating from the second microparticles D2 is formed uniformly.

In the manufacturing method of the film-formed body 1 in the first embodiment, furthermore, the first film 11 having the thickness T1 in the thickness direction DT of the metal foil 20 is positioned in the recess 56 depressed lower than the support surface 55 in the thickness direction DT, and then the second film 12 is formed on the second metal principal surface 22. As compared with the case where the first film 11 is not placed in the recess 56, the above case can reduce the influence of the thickness T1 of the first film 11. Specifically, if the first film 11 is not received in the recess 56, for example, a step or shoulder corresponding to the thickness of the first film 11 occurs on the second metal principal surface of the metal foil. In the case where the second film is formed on this second metal principal surface by use of the second film-forming device 50, accordingly, the thickness of the second film may differ between the portion overlapping with the film-forming overlap region RW and the portion overlapping with the film-forming non-overlap region RX or a step or shoulder may occur.

On the other hand, the manufacturing method of the film-formed body 1 in the first embodiment can appropriately form the second film 12 by preventing the defects that the thickness of the second film 12 differs or a step occurs according to different portions of the second metal principal surface 22 (the second film-forming surface 22C), that is, between the portion overlapping with the film-forming overlap region RW and the portion overlapping with the film-forming non-overlap region RX.

The manufacturing method of the film-formed body 1 of the first embodiment adopts the aerosol deposition method in the second film-forming step. For example, this can decrease the collision speed of the second aerosol SA2 than the case of using thermal spraying or cold spraying. It is therefore possible to form a film on the metal foil 20 while preventing deformation of the metal foil 20 such as depression, bending, and break.

Following the second film-forming step, the third film 13 is further formed on the second film 12 by using the second film-forming device 50 again.

To be specific, instead of the second mixed microparticles D2, third microparticles D3 made of phosphate solid electrolyte ($Li_{1.3}Al_{0.3}Ti_{1.7}(PO_4)_3$)) powder are supplied on the inside bottom plate 58R in the aerosol generator 58 shown in FIG. 6. Then, the opening of the container 58P is closed with the closing stopper 58Q. In a similar manner to the above film-forming of the second film 12, the regulator 59 is controlled to flow a predetermined flow rate of carrier gas (not shown) from the gas bomb GB, the third microparticles D3 thus form third aerosol AS3 in the aerosol generator 58.

The thus produced third aerosol AS3 is delivered to the injection nozzle 52, further accelerated through the injection part 52H, and injected to the second film 12. At that time, the slide part SW of the metal foil support member 53 holding the metal foil 20 is moved in the plane direction DS to form the third film 13 on the metal foil 20.

Thus, on the second film 12, the third film 13 made of the material (phosphate solid electrolyte ($Li_{1.3}Al_{0.3}Ti_{1.7}(PO_4)_3$)) originating from the third microparticles D3 is formed. The aforementioned film-formed body 1 is completed (see FIGS. 1, 2, and 3).

First Modified Example

The film-formed body 1 of the first modified example of the invention will be explained referring to FIGS. 1 to 3, 7, 10, and 11.

The first modified example is identical to the above first embodiment excepting that a depth F2 of a recess 156 in a metal foil support member 153 of a second film-forming device 150 used in the second film-forming step is larger than the thickness T1 of the first film 11 formed on the metal foil 20.

Accordingly, the following explanation will be made with a focus on differences from the first embodiment and identical parts are not explained or are briefly mentioned. The identical parts provide the same operations and effects as those in the first embodiment. Further, the identical parts are given the same reference numbers as those in the first embodiment.

Figure 10:
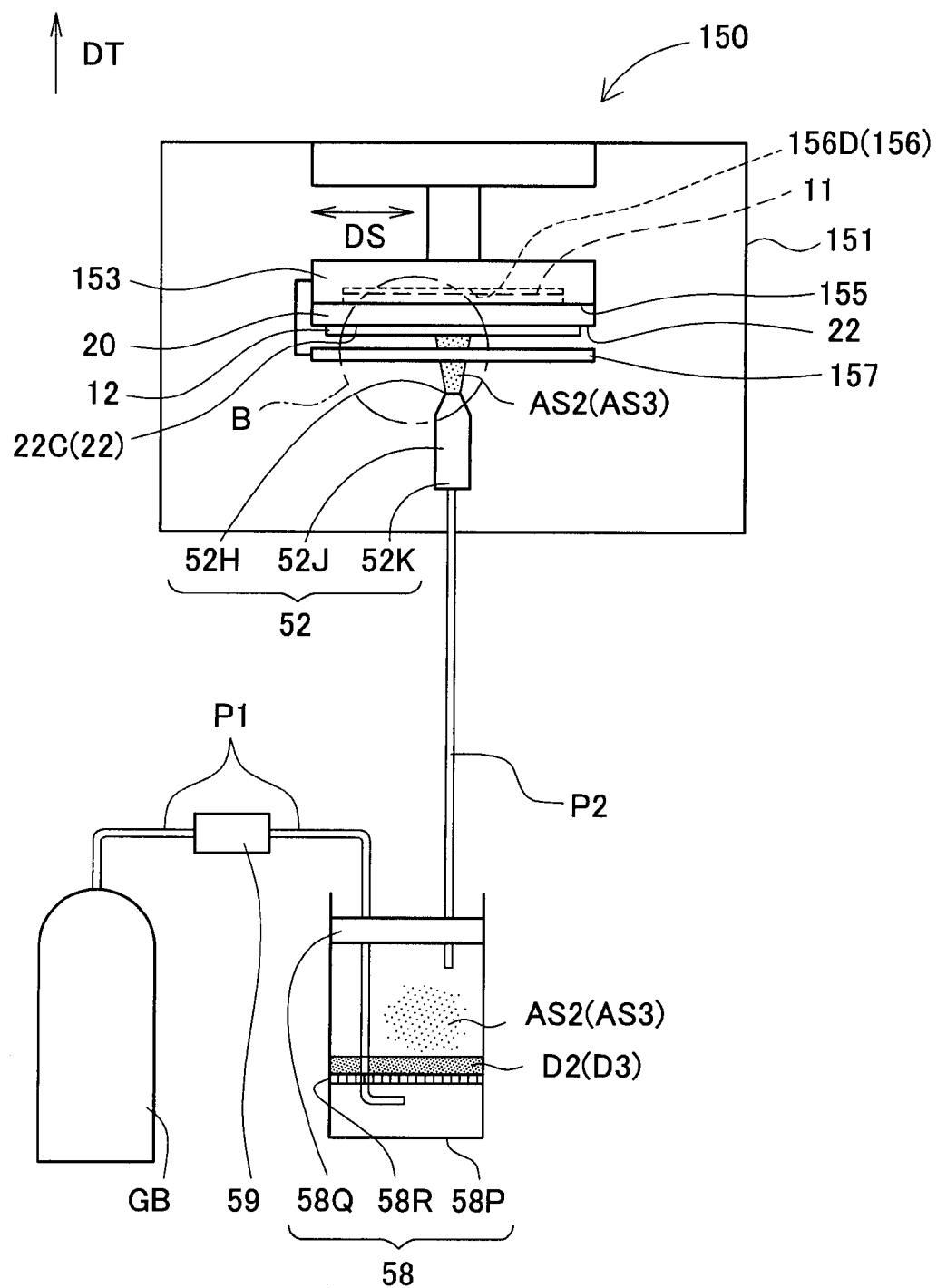
FIG. 10 is an explanatory view of the second film-forming step for the film-formed body in the first modified example.

FIG. 10 is a schematic view of the second film-forming device 150 used in the first modified example. This device 150 includes a film forming chamber 151 and, as with the first embodiment, an aerosol generator 58, a regulator 59, a gas bomb GB, a gas pipe P1, and an aerosol pipe P2.

The film forming chamber 151 includes a metal foil support member 153 for supporting the metal foil 20 while exposing the second metal principal surface 22 and an injection nozzle 52 identical to that in the first embodiment.

The metal foil support member 153 includes a holding part 154 for holding the metal foil 20 and a slide part SW for moving the metal foil 20 held in the holding part 154 in the plane direction as shown in FIG. 7. This metal foil support member 153 is further arranged to place a mask 157 between the injection nozzle 52 and the metal foil 20. The mask 157 is formed with a through hole for forming the second film 12 in a predetermined position on the second metal principal surface 22.

The holding part 154 made of metal includes a recess 156 centrally formed therein and configured to be slightly larger than the plane shape (a rectangular shape in this modified example) of the first film 11 to receive the first film 11 and a support surface 155 located along the circumference of the recess 156 and raised by a step from the recess 156.

Figure 11:
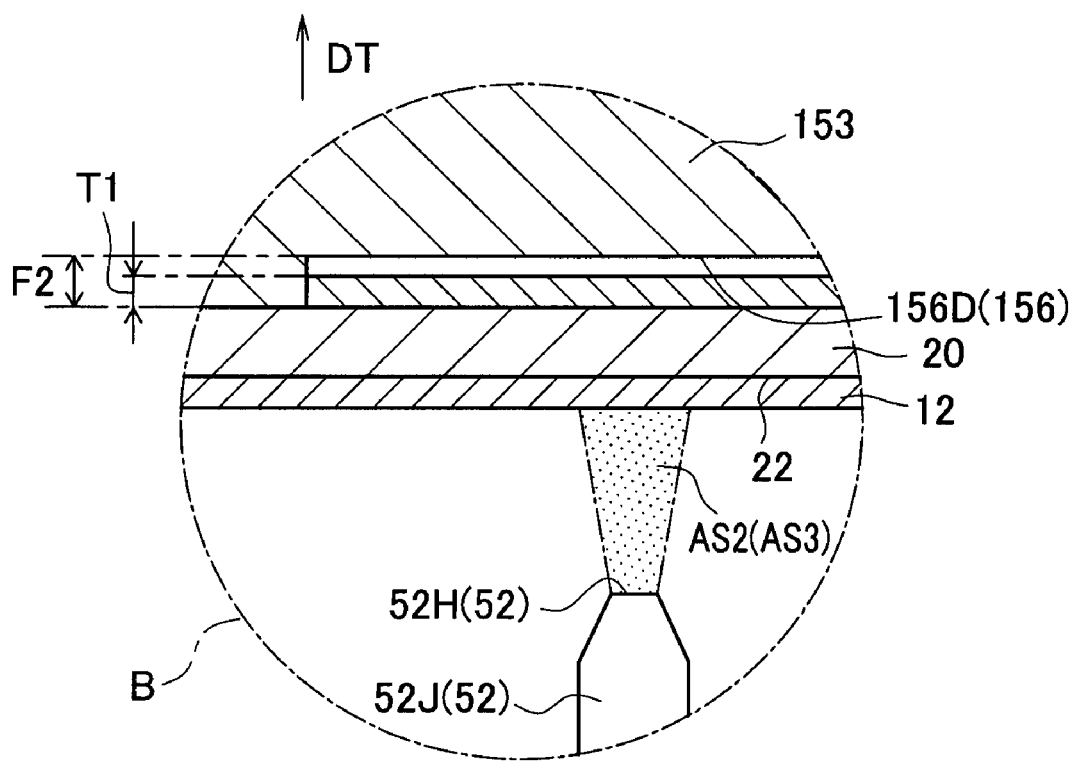
FIG. 11 is an explanatory view of the second film-forming step for the film-formed body in the first modified example.

Depth F2 of the recess 156 of the holding part 154 is larger than the thickness T1 of the first film 11 formed on the metal foil 20. As shown in FIGS. 10 and 11, specifically, the entire first film 11 is received in the recess 156 when the metal foil 20 formed with the first film 11 is held by the metal foil support member 153. On the other hand, the support surface 155 of the metal foil support member 153 can hold the first exposed portion 21F of the first metal principal surface 21. This can prevent the occurrence of a step or shoulder in the second metal principal surface 22 (the second film-forming surface 22C) and hence keep the second metal principal surface 22 flat.

In the second film-forming step, furthermore, the film-forming non-overlap region RX of the first exposed portion 21F is placed in contact with and supported by the support surface 155 of the metal foil support member 153. This prevents the first exposed portion 21F of the film-forming non-overlap region RX from separating from the support surface 155 around the first film 11. This also can avoid the occurrence of differences in ease of forming the second film 12 in association with the separation.

Subsequently, the following explanation will be given to the second film-forming step using the aforementioned second film-forming device 150 to form the second film 12 on the metal foil 20 formed with the first film 11, referring to FIG. 10.

Firstly, the metal foil 20 formed with the first film 11 produced in the first film-forming step in the first embodiment is prepared. This metal foil 20 is set in the metal foil support member 153 in the film forming chamber 151. To be concrete, the entire first film 11 is received in the recess 156 of the metal foil support member 153 so that the first exposed portion 21F of the first metal principal surface 21 is placed in contact with and held on the support surface 155. In this way, the second metal principal surface 22 of the metal foil 20 is placed to face the injection nozzle 52. At that time, the second metal principal surface 22 is made flat having no step or shoulder.

Thereafter, as with the first embodiment, the second aerosol AS2 delivered to the injection nozzle 52 is injected toward the second film-forming surface 22C of the second metal principal surface 22 to make the second mixed microparticles D2 collide and be deposited thereon. Thus, the second film 12 made of the material (lithium cobalt oxide and phosphate solid electrolyte ($Li_{1.3}Al_{0.3}Ti_{1.7}(PO_4)_3$)) originating from the second mixed microparticles D2 is formed. While this second film 12 is formed, the first metal principal surface 21 does not separate from the support surface 155. Thus, the second film 12 can be formed without differences in the ease of film-forming caused by the separation.

Following the second film-forming step, furthermore, the third film 13 is formed on the second film 12 by using the second film-forming device 150 again. To be concrete, instead of the second mixed microparticles D2, the third microparticles D3 made of phosphate solid electrolyte ($Li_{1.3}Al_{0.3}Ti_{1.7}(PO_4)_3$) powder are supplied on the inside bottom plate 58R in the aerosol generator 58 shown in FIG. 10.

Thus, the third film 13 made of the material (phosphate solid electrolyte ($Li_{1.3}Al_{0.3}Ti_{1.7}(PO_4)_3$)) originating from the third microparticles D3 is formed. The film-formed body 1 is completed (see FIGS. 1, 2, and 3).

Second Embodiment

A second embodiment of the invention will be explained below referring to FIGS. 2 and 12-18.

Figure 12:
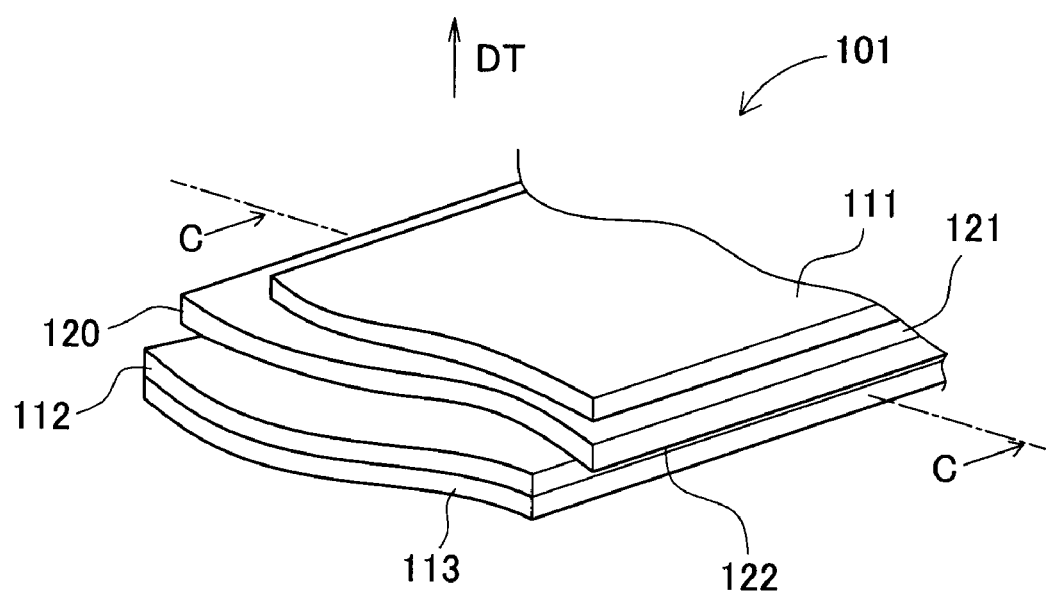
FIG. 12 is a perspective view of the film-formed body in the second modified example.
Figure 13:
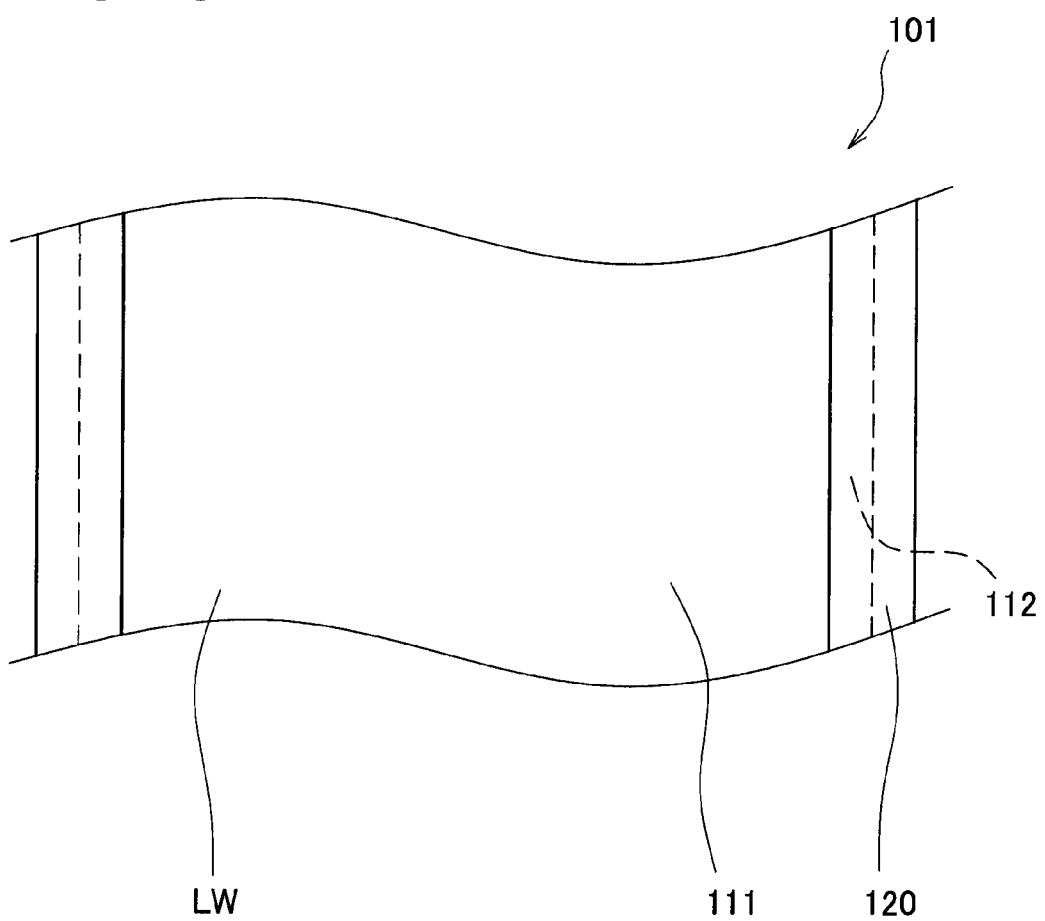
FIG. 13 is a top view of the film-formed body in the second modified example.

A film-formed body 101 in the second embodiment is first explained. FIG. 12 is a perspective view of the film-formed body 101 and FIG. 2 is a sectional view (section C-C in FIG. 12) of the film-formed body 101, respectively.

The film-formed body 101 in the second embodiment includes a long-strip shaped metal foil 120 made of stainless steel, a first film 111 containing a mixture of lithium titanium oxide ($Li_4Ti_5O_{12}$) and phosphate solid electrolyte ($Li_{1.3}Al_{0.3}Ti_{1.7}(PO_4)_3$), and a second film 112 containing a mixture of lithium cobalt oxide ($LiCoO_2$) and phosphate solid electrolyte ($Li_{1.3}Al_{0.3}Ti_{1.7}(PO_4)_3$). The film-formed body 101 further includes a third film 113 made of phosphate solid electrolyte ($Li_{1.3}Al_{0.3}Ti_{1.7}(PO_4)_3$). Those first film 111, second film 112, and third film 113 also each have a rectangular strip shape extending in a longitudinal direction (from lower left to upper right in FIG. 12) of the metal foil 120.

The film-formed body 101 is configured such that, on the metal foil 120, the first film 111 is formed on a first metal principal surface 121 facing upward in FIGS. 2 and 12, the second film 112 is formed on a second metal principal surface 122 facing downward in FIGS. 2 and 12, and further the third film 113 is formed on the second film 112.

As shown in the sectional view (FIG. 2) of the film-formed body 101, the width (a lateral direction in FIG. 2) of the second film 112 is larger than the width of the first film 111. Accordingly, the entire first film 111 is also an overlapping portion LW overlapping with the second film 112 when viewed in a thickness direction DT of the metal foil 120.

It is to be noted that when the above strip-shaped film-formed body 101 is cut into pieces in the longitudinal direction and the pieces are laminated in the thickness direction DT, this laminated body can constitute a power generating element BP of a bipolar secondary battery as shown in FIG. 4, as with the first embodiment.

The first film 111, the second film 112, and the third film 113 of the film-formed body 101 are formed by the aerosol deposition method using a third film-forming device 240 mentioned later.

A method for manufacturing the film-formed body 101 in the second embodiment will be explained below referring to the drawings.

Figure 14:
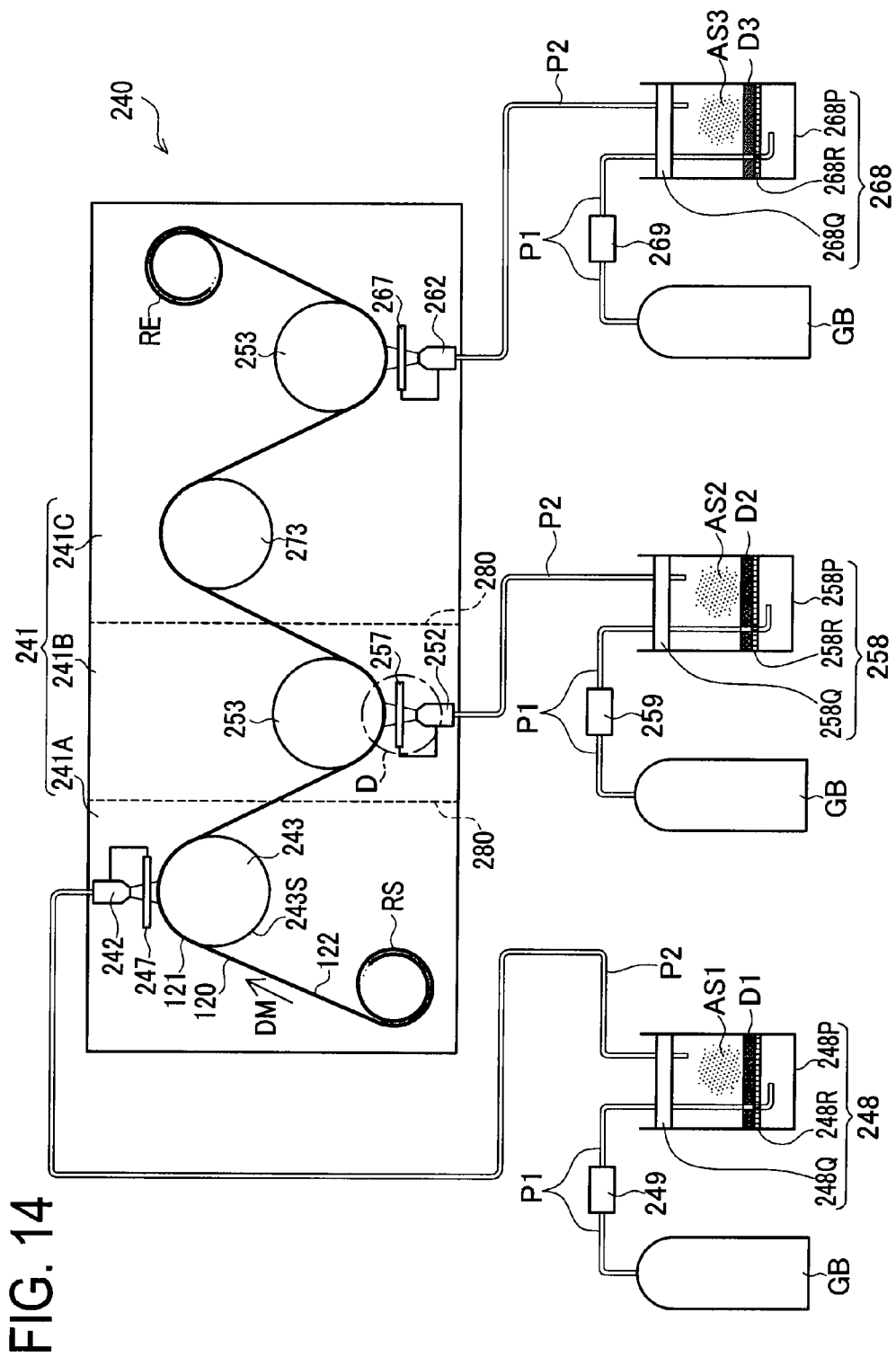
FIG. 14 is an explanatory view of a manufacturing step for the film-formed body in the second embodiment.

FIG. 14 is a schematic view of the third film-forming device 240. This third film-forming device 240 includes a film forming chamber 241, a first aerosol generator 248, a second aerosol generator 258, a third aerosol generator 268, a first regulator 249, a second regulator 259, a third regulator 269, three gas bombs GB, GB, GB, gas pipes P1, and aerosol pipes P2.

The three gas bombs GB, GB, GB are each filled with high-pressure argon gas used for carrier gas (not shown). Each gas bomb GB, GB, GB feeds carrier gas to the first aerosol generator 248, the second aerosol generator 258, or the third aerosol generator 268 through the corresponding metal gas pipe P1 connected to the subject gas bomb GB. At some point in the gas pipe P1, the first regulator 249, the second regulator 259, or the third regulator 269 is placed to control the flow rate of the carrier gas to be fed from the corresponding gas bomb GB.

Furthermore, the first, second, third aerosol generators 248, 258, and 269 include bottom-closed cylindrical containers 248P, 258P, and 268P, closing stoppers 248Q, 258Q, and 268Q for closing openings of the containers 248P, 258P, and 268P, and inside bottom plates 248R, 258R, and 268R, respectively. Each of the inside bottom plates 248R, 258R, and 268R has a meshed plate surface and is placed, like a raised bottom, at a predetermined distance from the bottom (a lower position in FIG. 14) of the container 248P, 258P, or 268P.

In each closing stopper 248Q, 258Q, and 268Q, the corresponding gas pipe P1 and aerosol pipe P2 are inserted to pass through. In each inside bottom plate 248R, 258R, and 268R, the corresponding gas pipe P1 is inserted to pass through as shown in FIG. 14.

The inside bottom plate 248R in the first aerosol generator 248 holds, on its side facing the stopper 248Q, first mixed microparticles D1 containing a mixture of lithium titanium oxide ($Li_4Ti_5O_{12}$) powder and phosphate solid electrolyte ($Li_{1.3}Al_{0.3}Ti_{1.7}(PO_4)_3$) powder. A mesh pore diameter of the plate surface of the inside bottom plate 248R is smaller than a particle diameter of the first mixed microparticles D1. Consequently, this inside bottom plate 248R does not allow the first mixed microparticles D1 to pass through but does allow gas, i.e., the carrier gas (not shown) to pass through. The first aerosol generator 248 therefore can generate first aerosol AS1 in which the first mixed microparticles D1 are dispersed in the carrier gas.

The inside bottom plate 258R in the second aerosol generator 258 holds, on its surface facing the stopper 258Q, second mixed microparticles D2 containing a mixture of lithium cobalt oxide powder and phosphate solid electrolyte ($Li_{1.3}Al_{0.3}Ti_{1.7}(PO_4)_3$) powder. The second aerosol generator 258 thus can generate second aerosol AS2 in which the second mixed microparticles D2 are dispersed in the carrier gas (not shown), as with the first aerosol generator 248.

The inside bottom plate 268R in the third aerosol generator 268 holds, on its surface facing the stopper 268Q, third microparticles D3 containing phosphate solid electrolyte ($Li_{1.3}Al_{0.3}Ti_{1.7}(PO_4)_3$) powder. Accordingly, the third aerosol generator 268 can generate, as with the first and second aerosol generators 248 and 258, third aerosol AS3 in which the third microparticles D3 are dispersed in the carrier gas.

The film forming chamber 241 includes a reel-out part RS for reeling out the metal foil 120, a first backup roll member 243 having a cylindrical surface, two second backup roll members 253, 253, an auxiliary roll member 273, and a reel-up part RE for reeling in the film-formed body 101. In addition, the film forming chamber 241 includes a first injection nozzle 242 for injecting the first aerosol AS1, a second injection nozzle 252 for injecting the second aerosol AS2, and a third injection nozzle 262 for injecting the third aerosol AS3. This film forming chamber 241 is divided into a first film forming chamber 241A, a second film forming chamber 241B, and a third film forming chamber 241C by partition walls 280 that do not allow the powder to pass through. Each of the film forming chambers 241A, 241B, and 241C can be reduced in pressure to $10^{-1}$ Pa by use of a vacuum pump not shown.

The reel-out part RS reels out the metal foil 120 toward the first backup roll member 243 to move the metal foil 120 in the longitudinal direction DM. On the other hand, the reel-up part RE reels up a completed film-formed body 101 having been applied with the third aerosol AS3 by moving the film-formed body 101 in the longitudinal direction DM.

The first backup roll member 243 is placed in the first film forming chamber 241A and has a cylindrical peripheral wall 243S made of metal, a part of which contacts with the second metal principal surface 122 of the metal foil 120. The first backup roll member 243 can hold the metal foil 120 so that the first metal principal surface 121 of the metal foil 120 faces the first injection nozzle 242.

Figure 15:
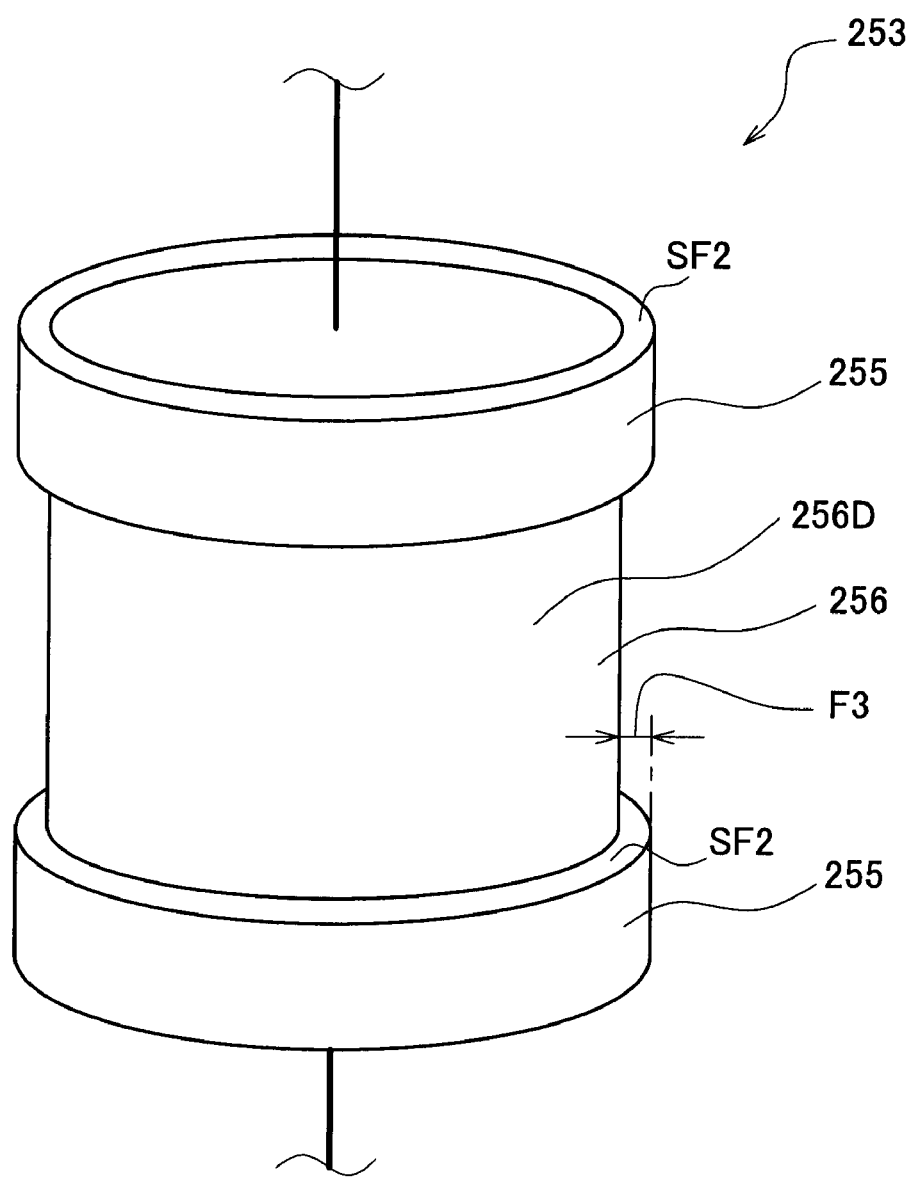
FIG. 15 is another explanatory view of the manufacturing step for the film-formed body in the second embodiment.

The second backup roll members 253, 253 each made of metal placed in the second film forming chamber 241B and the third film forming chamber 241C respectively include a recess (a groove) 256 located in the center in the axial direction and recessed along a peripheral direction and support surfaces 255 provided on both sides (upper and lower sides in FIG. 15) of the recess 256 in the axial direction and having a larger diameter than that of the recess 256 as shown in FIG. 15. The recess 256 has a slightly larger size (width) in the axial direction of the second backup roll member 253 than the width of the strip-shaped first film 111. A bottom surface 256D of this recess 256 is defined by an exposed part of the metal forming the second backup roll member 253.

Depth F3 of the recess 256 (a distance in a radial direction from the support surface 255 to the bottom surface 256D) is set to be equal to the thickness T1 of the first film 111 formed on the metal foil 120. Accordingly, when a part of the metal foil 120 formed with the first film 111 is to be supported by the second backup roll member 253, the first film 111 can be received in the recess 256 and contact with the bottom surface 256D (see FIG. 16).

On the other hand, when the part of the metal foil 120 formed with the first film 111 is to be supported by the second backup roll member 253, the support surfaces 255 support part of first exposed portions 121F of the first metal principal surface 121 of the metal foil 120.

Each support surface 255 of the second backup roll member 253 is coated with a film SF2 (Thickness TS) made of lithium titanium oxide ($Li_4Ti_5O_{12}$) and phosphate solid electrolyte ($Li_{1.3}Al_{0.3}Ti_{1.7}(PO_4)_3$) as with the first film 111. Thus, each support surface 255 has first hardness. On the other hand, the bottom surface 256D of the recess 256 is made of the metal forming the second backup roll member 253 and hence has second hardness different from the first hardness. As with the first embodiment, those first hardness and second hardness are determined to prevent a difference in the ease of forming the second film 112 on the second film-forming surface 122C of the second metal principal surface 122 (e.g., the reactive force the second aerosol AS2 (the second mixed microparticles D2) receives from the metal foil 120 when collides therewith) and make the ease of film-forming uniform in the plane direction. When the second film 112 is to be formed, accordingly, the second film 112 can be formed with uniform thickness and quality over the second film-forming surface 122C of the second metal principal surface 122.

As shown in FIGS. 14 and 15, the first injection nozzle 242 is oriented perpendicularly to a portion of the metal foil 120 held by the peripheral wall 243S of the first backup roll member 243 in the first film forming chamber 241A. The second injection nozzle 252 is oriented perpendicularly to a portion of the metal foil 120 held in the recess 256 and the support surfaces 255 of the second backup roll member 253 in the second film forming chamber 241B. The third injection nozzle 262 is oriented perpendicularly to a portion of the metal foil 120 held in the recess 256 and the support surfaces 255 of the second backup roll member 253 in the third film forming chamber 241C.

The first injection nozzle 242, the second injection nozzle 252, and the third injection nozzle 262 are repeatedly moved in a short side direction of the metal foil 120 (in a direction from a back side to a front side in FIG. 14) to form the first film 111, the second film 112, or the third film 113 on the metal foil 120. Between the first injection nozzle 242 and the metal foil 120, a first mask 247 formed with a through hole is placed to form the first film 111 in a predetermined position on the first metal principal surface 121. Between the second injection nozzle 252 and the metal foil 120, a second mask 257 formed with a through hole is placed to form the second film 112 in a predetermined position on the second metal principal surface 122. Between the third injection nozzle 262 and the metal foil 120, furthermore, a third mask 267 formed with a through hole is placed to form the third film 113 on the second film 112.

A method for manufacturing the film-formed body 101 by using the aforementioned third film-forming device 240 is explained below, referring to FIG. 14.

The first film 111 is first formed with the thickness T1 on the first metal principal surface 121 of the metal foil 120 by use of the first backup roll member 243 and the first injection nozzle 242 in the film forming chamber 241.

To be specific, the first film forming chamber 241A, the second film forming chamber 241B, and the third film forming chamber 241C of the film forming chamber 241 are all reduced in pressure to $10^2$ Pa. The first mixed microparticles D1 are supplied in the first aerosol generator 248, which is then closed. The first regulator 249 located at some point in the gas pipe P1 is controlled to flow a predetermined flow rate of carrier gas (not shown) from the gas bomb GB. This carrier gas flows in the first aerosol generator 248 through the gas pipe P1. This carrier gas raises or stirs up the first mixed microparticles D1 in a space between the inside bottom plate 248R and the closing stopper 248Q, forming the first aerosol AS1. Thus, the first mixed microparticles D1 of a predetermined carrying quantity per unit time are carried by the carrier gas.

The thus produced first aerosol AS1 is delivered to the first injection nozzle 242 in the film forming chamber 241 (the first film forming chamber 241A) through the aerosol pipe P2 and injected toward the first film-forming surface 121C of the first metal principal surface 121 of the metal foil 120. Accordingly, the first mixed microparticles D1 collide with and are deposited on the first metal principal surface 121.

As above, on the first film-forming surface 121C of the first metal principal surface 121, the first film 111 made of the material (lithium titanium oxide ($Li_4Ti_5O_{12}$) and phosphate solid electrolyte ($Li_{1.3}Al_{0.3}Ti_{1.7}(PO_4)_3$)) originating from the first mixed microparticles D1 is formed with the thickness T1

Next, a second film-forming step is explained to form the second film 112 on the second metal principal surface 122 of the metal foil 120 by using the second backup roll member 253 and the second injection nozzle 252 in the second film forming chamber 241B.

Figure 16:
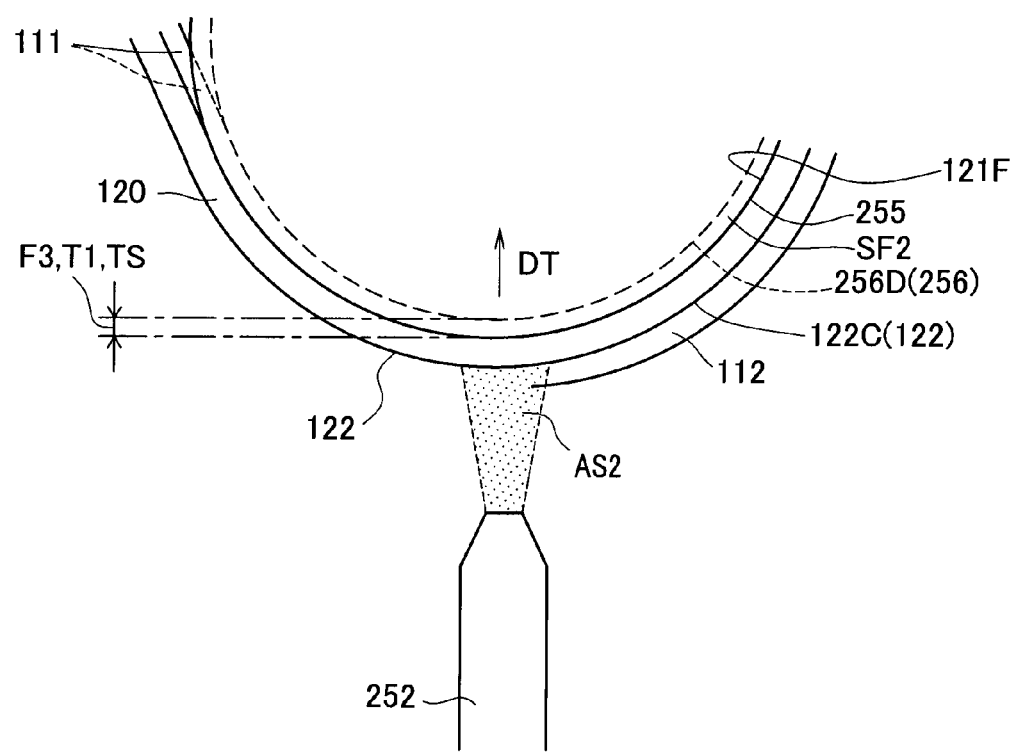
FIG. 16 is another explanatory view of the manufacturing step for the film-formed body in the second embodiment.

Firstly, the metal foil 120 formed with the first film 111 is supported by the second backup roll member 253 in the second film forming chamber 241B. To be concrete, as shown in FIG. 16 showing an enlarged view of a part D in FIG. 14, the entire first film 111 is received in the recess 256 of the second backup roll member 253 so that a part of the first exposed portion 121F not formed with the first film 111, of the first metal principal surface 121 of the metal foil 120, is placed, or wound, in contact with the support surfaces 255. Thus, a part of the second metal principal surface 122 of the metal foil 120 faces the second injection nozzle 252. In this state, a part of the second metal principal surface 122 has no step or the like.

The second mixed microparticles D2 are supplied in the second aerosol generator 258, which is then closed. The second regulator 259 placed at some point in the gas pipe P1 is controlled to flow a predetermined flow rate of carrier gas (not shown) from the gas bomb GB. This carrier gas flows in the second aerosol generator 258 through the gas pipe P1, thereby transforming the second mixed microparticles D2 into the second aerosol AS2. Thus, the second mixed microparticles D2 of a predetermined carrying quantity per unit time are carried by the carrier gas.

The thus produced second aerosol AS2 is delivered to the second injection nozzle 252 in the film forming chamber 241 (the second film forming chamber 241B) through the aerosol pipe P2 and injected toward the second film-forming surface 122C of the second metal principal surface 122 of the metal foil 120. Accordingly, the second mixed microparticles D2 collide with and are deposited on the second metal principal surface 122.

Figure 17:
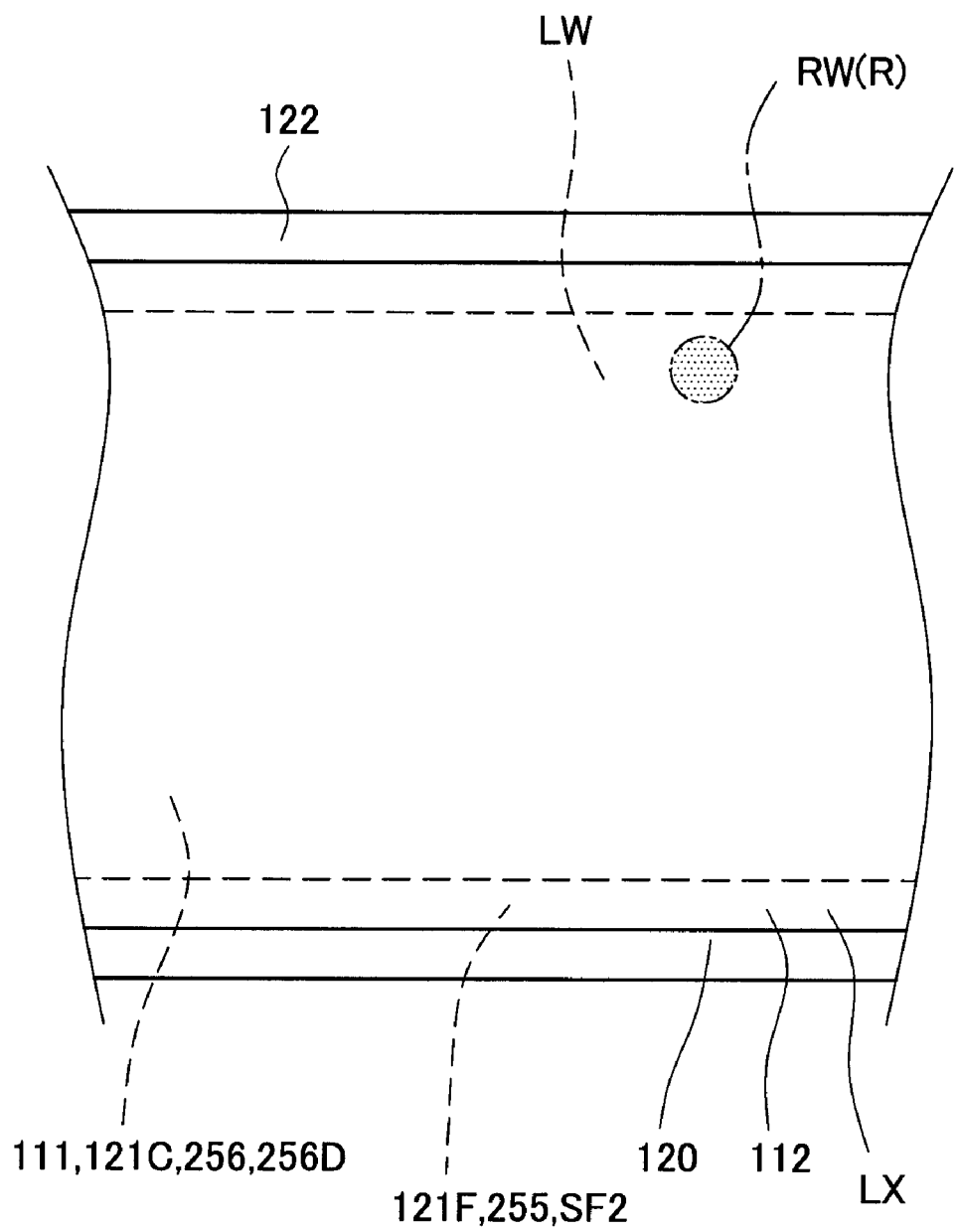
FIG. 17 is another explanatory view of the manufacturing step for the film-formed body in the second embodiment.
Figure 18:
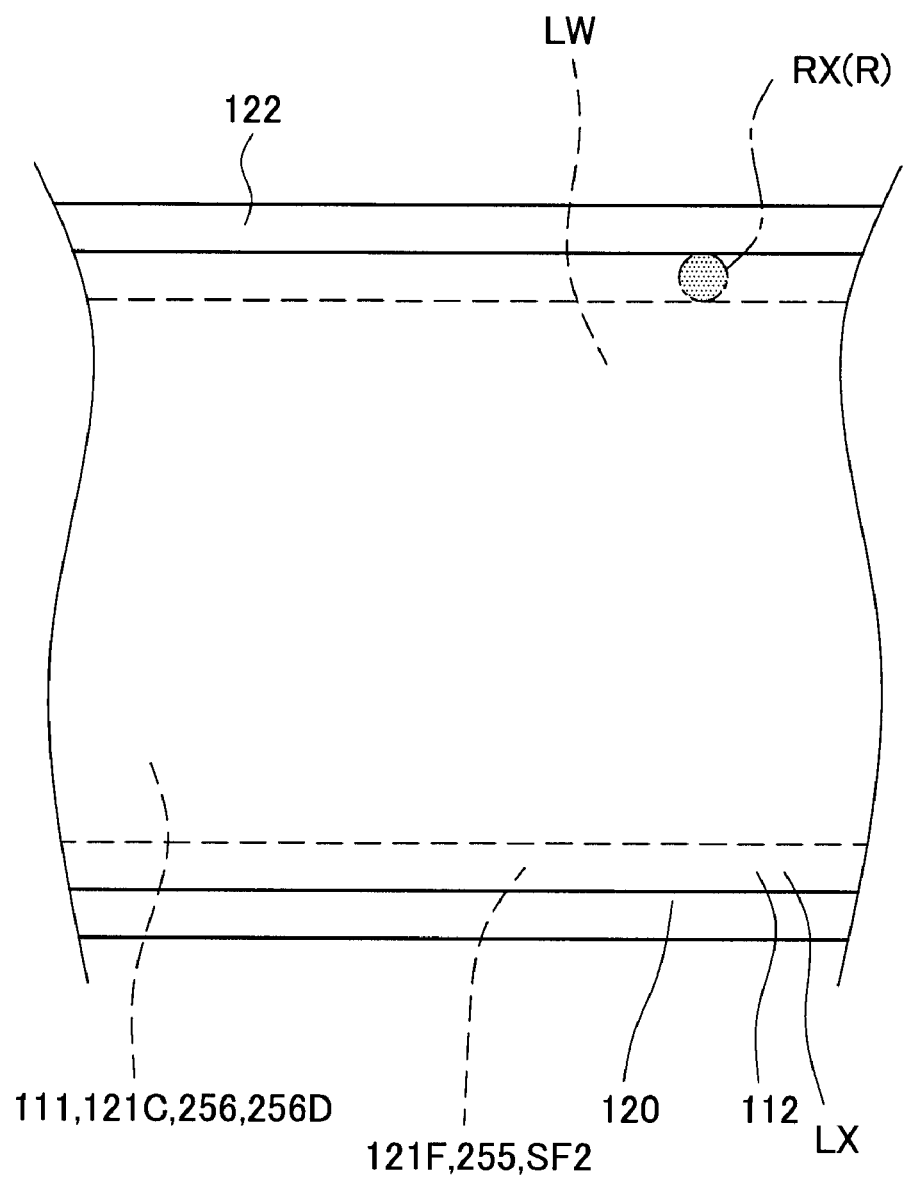
FIG. 18 is another explanatory view of the manufacturing step for the film-formed body in the second embodiment.

The metal foil 120 held by the second backup roll member 253 and applied with the second aerosol AS2 will be further explained in detail referring to FIGS. 17 and 18 showing the metal foil 120 viewed in the thickness direction DT.

A region of the second metal principal surface 122 with which the second mixed microparticles D2 are colliding to form the second film 112 is referred to as a second film forming region R. A region of the overlapping portion LW (the first film 111), the region overlapping the second film-forming region R when viewed in the thickness direction DT, is referred to as a film-forming overlap region RW. In the manufacturing method of the film-formed body 101 in the second embodiment, this film-forming overlap region RW is placed in the recess 256 of the second backup roll member 253 (see FIG. 17). On the other hand, a region of the first exposed portion 121F of the first metal principal surface 121 of the metal foil 120, the region overlapping the second film-forming region R when viewed in the thickness direction DT of the metal foil 120, is referred to a film-forming non-overlap region RX. In the second embodiment, therefore, this film-forming non-overlap region RX is positioned on the support surface 255 of the second backup roll member 253 (see FIG. 18).

As above, when the film-forming overlap region RW is received in the recess 256 while the film-forming non-overlap regions RX are placed on the support surfaces 255, the each of film-forming is made uniform between the portion overlapping with the film-forming overlap region RW and the portion overlapping with the film-forming non-overlap region RX in the second film-forming surface 122C of the second metal principal surface 122. Therefore, the second mixed microparticles D2 uniformly collide with and are deposited on the second film-forming surface 122C of the second metal principal surface 122.

On the second film-forming surface 122C of the second metal principal surface 122, the second film 112 made of the material (lithium cobalt oxide and phosphate solid electrolyte $(Li_{1.3}Al_{0.3}Ti_{1.7}(PO_4)_3)$) originating from the second mixed microparticles D2 is formed uniformly.

Following the above second film-forming step, the third film 113 is formed on the second film 112 formed on the second metal principal surface 122 of the metal foil 120 by the second backup roll member 253 in the third film forming chamber 241C.

To be concrete, firstly, the third microparticles D3 are supplied in the third aerosol generator 268, which is then closed. The third regulator 269 placed at some point in the gas pipe P1 is controlled to flow a predetermined flow rate of carrier gas (not shown) from the gas bomb GB. This carrier gas flows in the third aerosol generator 268 through the gas pipe P1, thereby transforming the third microparticles D3 into the third aerosol AS3. Accordingly, the third microparticles D3 of a predetermined carrying quantity per unit time are carried by the carrier gas.

The thus produced third aerosol AS3 is delivered to the third injection nozzle 262 in the film forming chamber 241 (the third film forming chamber 241C) through the aerosol pipe P2 and injected toward the second film 112 formed on the second metal principal surface 122 of the metal foil 120 to make the third microparticles D3 collide and be deposited on the second film 112.

Thus, the third film 113 made of the material (phosphate solid electrolyte $(Li_{1.3}Al_{0.3}Ti_{1.7}(PO_4)_3)$) originating from the third microparticles D3 is formed. The aforementioned film-formed body 101 is consequently completed (see FIGS. 2, 12, and 13).

According to the method for manufacturing the film-formed body 101 in the second embodiment mentioned above, in addition to the operations and effects described in the first embodiment, the first film 111, the second film 112, and the third film 113 can be continuously formed on the strip-shaped metal foil 120 by use of the third film-forming device 240. This can reduce the number of working steps.

The present invention is explained in the above first and second embodiments and the first modified example but not limited thereto. The present invention may be embodied in other specific forms without departing from the essential characteristics thereof.

For instance, in the first embodiment and others, the film-formed body constitutes a part of the power generating element BP usable for a bipolar secondary battery. As an alternative, the film-formed body has only to include a second film formed on a second film-forming surface of a substrate by the aerosol deposition method and a first film including an overlapping portion that overlaps with the second film when viewed in the thickness direction of the substrate. Examples thereof are components for fuel battery, piezoelectric substances, condenser parts directly formed on the substrate, and others.

The above first film is made of the material containing a mixture of lithium titanium oxide $(Li_4Ti_5O_{12})$ and phosphate solid electrolyte $(Li_{1.3}Al_{0.3}Ti_{1.7}(PO_4)_3)$ and the second film is made of the material containing a mixture of lithium cobalt oxide $(LiCoO_2)$ and phosphate solid electrolyte $(Li_{1.3}Al_{0.3}Ti_{1.7}(PO_4)_3)$. As an alternative, the second film may be made of a material containing a mixture of lithium titanium oxide $(Li_4Ti_5O_{12})$ and phosphate solid electrolyte $(Li_{1.3}Al_{0.3}Ti_{1.7}(PO_4)_3)$ and the first film may be made of a material containing lithium cobalt oxide $(LiCoO_2)$ and phosphate solid electrolyte $(Li_{1.3}Al_{0.3}Ti_{1.7}(PO_4)_3)$.

In the first embodiment and others, the first film is made by the aerosol deposition method. However, the manufacturing method thereof is not particularly limited. The first film may be made by for example plating, coating, sputtering, or another technique. Furthermore, the second film is made by the aerosol deposition method. As an alternative, the second film may be made by a gas deposition method in which a raw material is evaporated and vaporized and then precipitated in the form of nanoparticles in gas phase, and the precipitated nanoparticles are dispersed in carrier gas and caused to collide with a substrate to form the second film.

The above support member is an integral member formed with the recess. Alternatively, the support member may be constituted of a plurality of parts or components. For example, a member formed with a through hole in only a portion corresponding to a recess may be placed on a base member to provide a support surface and a recess.

In the first and second embodiments, the metal forming the support member is exposed on the bottom surface of the recess, the support surface is coated with the same film as the first film, providing a difference between the hardness of the support surface and the bottom surface of the recess. Alternatively, the hardness of the support surface and the hardness of the bottom surface of the recess have only to be different from each other to reduce a difference in thickness between a portion of the second film overlapping with the film-forming overlap region and a portion of the second film overlapping with the film-forming non-overlap region. The above carrier gas is argon gas but may be selected appropriately according to characteristics of a film to be formed on a film-forming surface, compositions of microparticles, and others. For example, it may be dry air, nitrogen gas, helium gas, oxygen gas. The above carrier gas is a single kind of gas but may be a mixture of plural different kinds of gases.

The invention claimed is:

1. A method for manufacturing a film-formed body comprising:
a substrate having a first film-forming surface and a second film-forming surface which is a back side of the first film-forming surface, wherein the substrate has a thickness extending in a substrate thickness direction;
a first film formed on a part of the first film-forming surface of the substrate; and
a second film formed on at least part of the second film-forming surface of the substrate,
the first film including an overlapping portion that overlaps with the second film when viewed in the substrate thickness direction, the method comprising:
  a second film-forming step of forming the second film by making microparticles collide with and be deposited on the at least part of the second film-forming surface of the substrate after the first film has been formed on the part of the first film-forming surface of the substrate,
  wherein the second film-forming step includes forming the second film by using a support member having a support surface and a recess depressed lower than the support surface, and
  wherein the second film-forming surface of the substrate includes a second film-forming region in which the microparticles collide to form the second film; and
  placing in the recess of the support member, a film-forming overlap region of the overlapping portion of the first film, wherein the film-forming overlap region of the overlapping portion of the first film overlaps with at least part of the second film-forming region when viewed in the substrate thickness direction.

2. The method of manufacturing the film-formed body according to claim 1, wherein
  the second film-forming step further comprising placing a film-forming non-overlap region of a first exposed portion of the first film-forming surface on the support surface of the support member, the film-forming non-overlap region overlapping at least the second film forming region when viewed in the substrate thickness direction and the first exposed portion being exposed without being formed with the first film.

3. The method of manufacturing the film-formed body according to claim 2, wherein
  the recess of the support member has a depth larger than thickness of the first film,
  the second film-forming step further comprises forming the second film while holding the film-forming non-overlap region on the support surface of the support member.

4. The method of manufacturing the film-formed body according to claim 2, wherein
  the recess of the support member has a depth less than or equal to the thickness of the first film,
  the support surface of the support member and a bottom surface of the recess have different hardnesses,
  the hardnesses are determined such that a difference in thickness between a portion of the second film overlapping with the film-forming overlap region and a portion of the second film overlapping with the film-forming non-overlap region when viewed in the substrate thickness direction is minimized.

5. The method of manufacturing the film-formed body according to claim 1, wherein the second film-forming step comprises an aerosol deposition method or a gas deposition method.

6. The method of manufacturing the film-formed body according to claim 2, wherein the second film-forming step comprises an aerosol deposition method or a gas deposition method.

7. The method of manufacturing the film-formed body according to claim 3, wherein the second film-forming step comprises an aerosol deposition method or a gas deposition method.

8. The method of manufacturing the film-formed body according to claim 4, wherein the second film-forming step comprises an aerosol deposition method or a gas deposition method.

* * * * *